US011115645B2

United States Patent
Yang et al.

(10) Patent No.: US 11,115,645 B2
(45) Date of Patent: *Sep. 7, 2021

(54) GENERATING NOVEL VIEWS OF A THREE-DIMENSIONAL OBJECT BASED ON A SINGLE TWO-DIMENSIONAL IMAGE

(71) Applicant: ADOBE INC., San Jose, CA (US)

(72) Inventors: Jimei Yang, Santa Clara, CA (US); Duygu Ceylan Aksit, Mountain View, CA (US); Mehmet Ersin Yumer, San Jose, CA (US); Eunbyung Park, Chapel Hill, NC (US)

(73) Assignee: ADOBE INC., San Jose, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/230,872

(22) Filed: Dec. 21, 2018

(65) Prior Publication Data
US 2019/0124322 A1 Apr. 25, 2019

Related U.S. Application Data

(63) Continuation of application No. 15/433,731, filed on Feb. 15, 2017, now Pat. No. 10,165,259.

(51) Int. Cl.
*G06K 9/00* (2006.01)
*H04N 13/282* (2018.01)
(Continued)

(52) U.S. Cl.
CPC ......... *H04N 13/282* (2018.05); *G06K 9/6232* (2013.01); *G06K 9/6256* (2013.01);
(Continued)

(58) Field of Classification Search
CPC ......... G06T 15/205; G06T 2207/10028; G06T 5/005; G06T 3/00; G06T 3/0093; H04N 13/111

See application file for complete search history.

(56) References Cited

U.S. PATENT DOCUMENTS 9,406,164 B2 8/2016 Kho et al.
2012/0001902 A1* 1/2012 Lee ................ G06T 15/205
345/419

(Continued)

OTHER PUBLICATIONS

Zhou, T., Tulsiani, S., Sun, W., Malik, J. and Efros, A.A., 2016, October. View synthesis by appearance flow. In European conference on computer vision (pp. 286-301). Springer, Cham. (Year: 2016).*

(Continued)

*Primary Examiner* — Li Liu

(74) *Attorney, Agent, or Firm* — Shook, Hardy & Bacon L.L.P.

(57) ABSTRACT

Embodiments are directed towards providing a target view, from a target viewpoint, of a 3D object. A source image, from a source viewpoint and including a common portion of the object, is encoded in 2D data. An intermediate image that includes an intermediate view of the object is generated based on the data. The intermediate view is from the target viewpoint and includes the common portion of the object and a disoccluded portion of the object not visible in the source image. The intermediate image includes a common region and a disoccluded region corresponding to the disoccluded portion of the object. The disoccluded region is updated to include a visual representation of a prediction of the disoccluded portion of the object. The prediction is based on a trained image completion model. The target view is based on the common region and the updated disoccluded region of the intermediate image.

20 Claims, 17 Drawing Sheets

(51) Int. Cl.
  G06K 9/62      (2006.01)
  H04N 13/161    (2018.01)
  H04N 13/275    (2018.01)
  G06T 11/00     (2006.01)
  G06T 15/20     (2011.01)
  H04N 13/111    (2018.01)

(52) U.S. Cl.
  CPC ............ *G06T 11/00* (2013.01); *G06T 15/205* (2013.01); *H04N 13/161* (2018.05); *H04N 13/275* (2018.05); *H04N 13/111* (2018.05)

(56) References Cited

U.S. PATENT DOCUMENTS

| | | | | |
|---|---|---|---|---|
| 2012/0114225 | A1* | 5/2012 | Lim | G06K 9/00201 382/154 |
| 2012/0162395 | A1* | 6/2012 | Ho | H04N 13/122 348/51 |
| 2013/0106848 | A1 | 5/2013 | Nguyen et al. | |
| 2013/0182184 | A1 | 7/2013 | Senlet et al. | |
| 2014/0300566 | A1* | 10/2014 | Lee | G06T 15/00 345/173 |
| 2017/0308990 | A1 | 10/2017 | Middleton et al. | |
| 2018/0315239 | A1* | 11/2018 | Araki | G06T 15/205 |

OTHER PUBLICATIONS

Choy, C. B., Xu, D., Gwak, J., Chen, K., & Savarese, S. (Oct. 2016). 3d-r2n2: A unified approach for single and multi-view 3d object reconstruction. In European conference on computer vision (pp. 628-644). Springer, Cham. (Year: 2016).*

Hoiem, D., Efros, A. A., & Hebert, M. (Jul. 2005). Automatic photo pop-up. In ACM transactions on graphics (TOG) (vol. 24, No. 3, pp. 577-584). ACM. (Year: 2005).*

Yumer, M. E., & Mitra, N. J. (Oct. 2016). Learning semantic deformation flows with 3d convolutional networks. In European Conference on Computer Vision (pp. 294-311). Springer, Cham. (Year: 2016).*

Vetter, Thomas, and Tomaso Poggio. "Linear object classes and image synthesis from a single example image." IEEE Transactions on Pattern Analysis and Machine Intelligence 19.7 (1997): 733-742.

Beymer, David, and Tomaso Poggio. "Face recognition from one example view." Computer Vision, 1995. Proceedings., Fifth International Conference on. IEEE, 1995.

Cootes, Timothy F., K. Walker, and Christopher J. Taylor. "View-based active appearance models." Automatic Face and Gesture Recognition, 2000. Proceedings. Fourth IEEE International Conference on. IEEE, 2000.

Kholgade, Natasha, et al. "3D object manipulation in a single photograph using stock 3D models." ACM Transactions on Graphics (TOG) 33.4 (2014): 127.

Vetter, Thomas. "Synthesis of novel views from a single face image." International journal of computer vision 28.2 (1998): 103-116.

Rematas, Konstantinos, et al. "Novel views of objects from a single image." IEEE transactions on pattern analysis and machine intelligence 39.8 (2017): 1576-1590.

Tatarchenko, M., A. Dosovitskiy, and T. Brox. "Multi-view 30 Models from Single Images with a Convolutional Network." European Conference on Computer Vision (ECCV). 2016.

Yang, Jimei, et al. "Weakly-supervised disentangling with recurrent transformations for 3d view synthesis." Advances in Neural Information Processing Systems. 2015.

* cited by examiner

Intermediate Images | Target Images | Ground-Truth Target Images

GENERATING NOVEL VIEWS OF A THREE-DIMENSIONAL OBJECT BASED ON A SINGLE TWO-DIMENSIONAL IMAGE

CROSS REFERENCE TO RELATED APPLICATIONS

This application is a continuation of and claims priority to, U.S. patent application Ser. No. 15/433,731, filed on Feb. 15, 2017, entitled GENERATING NOVEL VIEWS OF A THREE-DIMENSIONAL OBJECT BASED ON A SINGLE TWO-DIMENSIONAL IMAGE, the entirety of which is incorporated herein by reference.

BACKGROUND

Two-dimensional (2D) image sensors, such as cameras embedded in consumer electronics, are now ubiquitous. As such, many users now enjoy ready access to digital photography. For instance, users often employ image sensors to capture 2D image data of three-dimensional (3D) physical objects. A single 2D image provides a single view of a 3D object from a single viewpoint, i.e. from the viewpoint of the image sensor. However, the user may desire another view of the 3D object from another viewpoint. Views of the object from other viewpoints traditionally require additional images taken from multiple viewpoints. For instance, stereoscopic photography is one well-known method that enables a user to view a 3D object from multiple viewpoints. However, such methods typically require data regarding the object beyond the data acquired via a single 2D image sensor positioned at a single viewpoint.

SUMMARY

The present invention is directed towards providing a target or novel view of a 3D object. The target view is from a target (or novel) viewpoint. Various methods include receiving a source image that includes a source view of the object, generating an intermediate image that includes an intermediate view of the object, updating a disoccluded region of the intermediate image, and providing the target view. The source image is encoded in 2D data. The source view is from a source viewpoint. Furthermore, the source view includes a common portion of the object. The intermediate image is based on the 2D data. The intermediate view is from the target viewpoint and includes the common portion of the object, as well as a disoccluded portion of the object. The disoccluded portion of the object is occluded (or not visible) in the source view. The intermediate image includes a common region corresponding to the common portion of the object. The intermediate image also includes a disoccluded region corresponding to the disoccluded portion of the object.

The disoccluded region of the intermediate image is updated to include at least a visual representation of a prediction of the disoccluded portion of the object. The prediction of the disoccluded portion of the object is based on a trained image completion model. The target view of the object is based on the common region of the intermediate image, as well as the updated disoccluded region of the intermediate image that includes the visual representation of the prediction of the disoccluded portion of the object.

Some methods further include generating a visibility map and determining a plurality of pixels included in the disoccluded region of the intermediate image based on the visibility map. The visibility map may be based on the source image and a rotational transformation from the source viewpoint to the target viewpoint.

At least one method includes generating a flow field that maps a common region of the source image to the common region of the intermediate image, determining pixel values for each of the pixels included in the common region of the intermediate image based on the flow field, and generating the intermediate image based on the determined pixel values included in the common region of the intermediate image. The flow field may be based on the rotational transformation from the source viewpoint to the target viewpoint. The common region of the source image corresponds to the common portion of the object. Determining the pixel values may be further based on a sampling kernel and at least a portion of the 2D data that encodes the source image. The portion of the 2D data corresponds to the common portion of the object.

Still other methods include determining a foreground region of the source image, determining a foreground of the intermediate image, and generating a background map based on the intersection of the foreground region of the source image and the foreground region of the intermediate image. The foreground region of the source image may correspond to the object. The foreground region of the intermediate image may correspond to the object. The methods further include determining a background region of the intermediate image based on the background map and determining a pixel value for the pixels included in the background region of the intermediate image. The pixel values may be based on a background region of the source image. The background region of the source image is the compliment to the foreground region of the source image.

Generating the intermediate image may be further based on a geometric flow model that determines a rotation of the object about an access included in a plane of the 2D data. The geometric flow model may be trained to determine a boundary of the common region of the intermediate image based on the 2D data that encodes the source image and the rotational transformation from the source viewpoint to the target viewpoint. Furthermore, the image completion model may be trained with a combination of an adversarial loss metric and a feature loss metric. The adversarial loss metric discriminates between synthetic images and natural images. The feature loss metric discriminates between physical features included in a plurality of images.

DETAILED DESCRIPTION

Figure 1A:
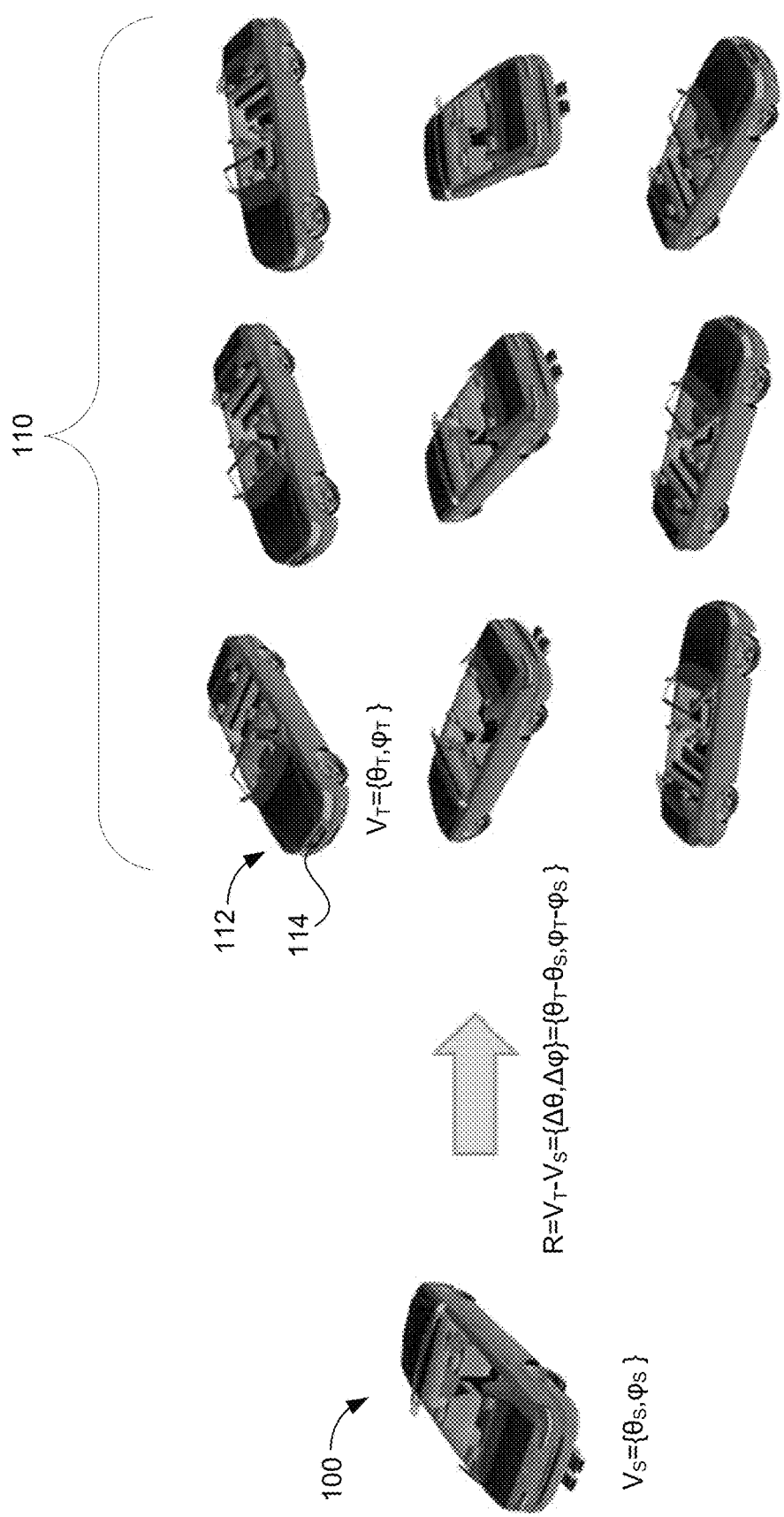
FIG. 1A illustrates an exemplary embodiment of a source image and multiple exemplary embodiments of a novel target images generated by the various embodiments discussed herein.

Briefly stated, various embodiments are directed towards generating and/or synthesizing novel views of a three-dimension (3D) object based on a single source (or input) image of the object. As used herein, the term "viewpoint" may refer to orientation of the optical axis of a viewer of an image. Thus, the "source viewpoint" may refer to at least an approximate position of an image sensor (e.g. a camera) that captures the source image. Likewise, the "target viewpoint" may refer to the position of a virtual camera that may be employed to capture the target image. For instance, a target viewpoint may be the viewpoint at which it appears the target image is captured. A viewpoint may be referenced, via spherical coordinates, such as the rotational orientation of the camera:$(\theta, \varphi)$. Accordingly, the viewpoint of an image may refer to the orientation of a vector normal to the image and positioned at the center of the image.

As used herein, the term "disoccluded portion of the object" is used to reference at least a portion of the portion of the object that is not visible (i.e. occluded) from the source viewpoint, but is visible (i.e. disoccluded) from the target viewpoint. Accordingly, the disoccluded portion of the object is a portion of the object is visible from the target viewpoint, but, in response to a rotational transformation from the target viewpoint to the source viewpoint, becomes occluded (i.e. the disoccluded portion is not visible from the source viewpoint).

As used herein, the term "common region" of an image may refer to the region of the image that corresponds to the common portion (relative to the source image) of the 3D object. Similarly, the "disoccluded region" of an image refers to the region of the image that corresponds to the disoccluded portion of the 3D object (i.e. the portion of the object that is non-visible/occluded from the source viewpoint but visible/disoccluded from the target viewpoint).

As used herein, the term "natural image" refers to an image where the pixel values are based directly on signals generated via one or more image sensors. In contrast, a "synthetic image" may include at least regions of pixels, where the corresponding pixel values are not directly based on signals generated via image sensors and/or cameras. Rather, the pixel values of a synthetic image may be predicted, determined, generated, hallucinated, deduced, or otherwise inferred from information other than image sensor signals. As used herein, the term "weights" may refer to the connectivity weights between the connections of the nodes of the various machine-learning networks discussed.

As noted above, embodiments are directed towards generating views of the 3D object based on a single source image of the object. The source image may be a two-dimensional (2D) image of the 3D object from a single source (or input) viewpoint. The various embodiments generate a target (or output) image of the object from a novel target (or output) viewpoint. Thus, the various embodiments provide a visual representation of a rotational transformation (corresponding to the transformation from the source viewpoint to the target viewpoint) of a 3D object based on 2D source data (from a single viewpoint) that lacks object information corresponding to the third spatial dimension. Furthermore, the 2D source data lacks information corresponding to portions of the 3D object that are occluded in the source viewpoint. The various embodiments hallucinate (or predict) the visual representation of such disoccluded portions of the 3D object and include the hallucination in the target image.

Previously available image generation or synthesis systems mainly employ one of two image synthesis methodologies: (a) geometry-based view synthesis and (b) image synthesis networks. Some previously available geometry-based systems employ multiple source images that include multiple views of the object (from multiple viewpoints.) For instance, stereoscopic photography techniques and techniques for interpolating visual information corresponding to a target viewpoint between the multiple input viewpoints have been employed in previous systems. In contrast to such previous systems, the various embodiments herein employ only a single 2D image, from a single viewpoint, of the 3D object.

Other geometry-based previously available systems include other limitations. As discussed below, such systems may be limited in an ability to hallucinate or predict portions of the object that are occluded in the source image, but are disoccluded from the target viewpoint. For instance, some geometry-based systems estimate a depth map corresponding to the portion of the object that is visible in the input image. Such systems generate a view of the object from a different viewpoint via geometric transformations of the depth map. However, because such systems employ only a single image, they are limited in the ability to hallucinate the disoccluded portion of the object.

Other geometry-based systems may employ collections of 3D models to hallucinate disoccluded portions of objects. For example, various previous systems first identify a type of object included in the input image. These systems may then access a 3D model for an object of an equivalent or similar object type. Such systems may have access to large 3D model databases, or search the Internet for a 3D model. However, such systems are limited in the availability of 3D models for similar object types. In contrast to these previous systems, the embodiments herein only rely on 3D models to train various machine-learning models, i.e. once trained, the various embodiments herein do not rely on 3D models to transform from the source viewpoint to the target viewpoint, or to hallucinate the disoccluded portions of the object.

Other previously available image synthesis systems have employed image synthesis networks to generate visual representations of previously unseen portions of objects. However, such image synthesis networks are typically not enabled to generalize hallucinations for object types not previously seen. Such systems may hallucinate global structures included in the object. However, the generated hallucinations may fail to hallucinate local structures included in the object or tend to include artifacts, such as blurriness and aliasing.

In contrast to these previously available systems, the various embodiments herein employ a plurality of trained image generation networks included in an automated image generation pipeline or workflow. The workflow receives a single 2D source image. The source image is from a source viewpoint. The workflow generates an intermediate image of the object from a target viewpoint, via a geometric flow network that is trained to transform 2D visual information included in the source image to a novel viewpoint. Unlike previous systems, the geometric flow network only requires a 3D model of the object during the training phase of the network, i.e. once trained a geometric flow network does not require a 3D model of the object when employed to transform 2D visual information included in the source image to a novel viewpoint. In further contrast to previous systems, the pixels corresponding to the disoccluded portion of the object (i.e. the portion of the object that is non-visible/occluded from the source viewpoint but visible/disoccluded from the target viewpoint) are masked in the intermediate image, via a visibility map. That is to say that the geometric flow network may be a disocclusion-aware network.

Another network (an image completion network) hallucinates the disoccluded portion of the object, within the intermediate image. Thus, the trained image completion network generates values for the masked pixels of the intermediate image. A target image is generated based on the intermediate image, including the hallucinated portion of the object. The workflow further refines the target image by removing artifacts that may have been generated by the various networks. As discussed below, another trained network (a loss network) may be employed to adversarially train the other networks. The loss network employs a combination of adversarial, (global and local) feature, and pixel loss functions and/or models.

FIG. 1A illustrates an exemplary embodiment of a single 2D source image 100 and multiple exemplary embodiments of novel target images 110 generated by the various embodiments discussed herein.

In FIG. 1A, 2D source image 110 is from source viewpoint $V_S=\{\theta_S, \phi_S\}$. Each of the target images 110 is from a separate target viewpoint. In particular, exemplary target image 112 is from target viewpoint $V_T=\{\theta_T, \phi_T\}$. Rotational transformation $R=V_T-V_S=\{\Delta\theta, \Delta^{SM}\}=\{\theta_T-\theta_S, \phi_T-\phi_S\}$, is a rotational transformation from the source viewpoint to the target viewpoint. Although the 3D object illustrated in FIG. 1A is an automobile, it should be understood that other embodiments are not so limited, and the object may be an object of virtually any object type.

As shown in FIG. 1A, rotational transformation R may result in a disocclusion of a portion of the 3D object (and an occlusion of another portion of the 3D object). For instance, if the axis of the rotational transformation is at least partially within the plane of the source image (i.e. the axis includes a component within the plane of the source image), a portion of the object is not visible from the source viewpoint, but is visible from the target viewpoint.

For objects lacking symmetry along one or more axes of the rotational transformation, the 2D source image lacks information associated with the disoccluded portion of the object (i.e. the portion of the object that is non-visible/occluded from the source viewpoint but visible/disoccluded from the target viewpoint). For instance, the grill portion 144 (or the front end) of the automobile is occluded in source image 110. However, the grill portion 114 is a disoccluded portion of the automobile because the grill portion is occluded in the source image 110, but becomes visible/disoccluded in target image 112 due to the rotational transformation from the source view to the target viewpoint. As also shown in FIG. 1A, the embodiments herein provide a visual representation of the disoccluded (or previously occluded) portion of the object. More specifically, the embodiments hallucinate (or predict) the disoccluded portion of the object without requiring input information corresponding to the disoccluded portion of the object.

Exemplary Image Generation System

Figure 1B:
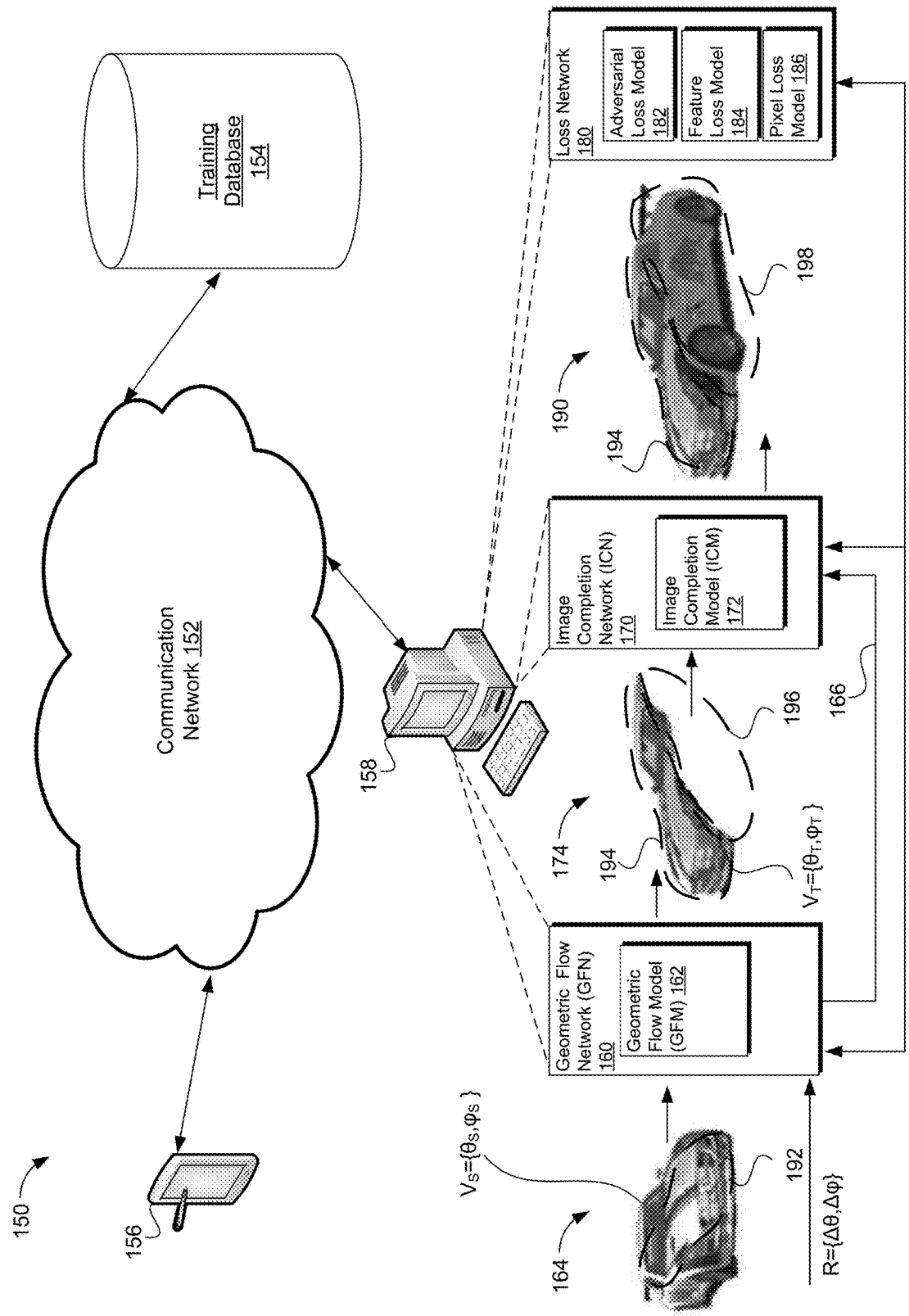
FIG. 1B illustrates an image generation system implementing various embodiments presented herein.

FIG. 1B illustrates an image generation system (IGS) 150 implementing various embodiments presented herein. System 150 includes an image generation computing device (IGCD) 158 and a user-computing device 156 that are communicatively coupled via communication network 152. Other embodiments of an IGS may include more or less computing devices. IGCD 158 may be employed to generate novel target images, as discussed in conjunction with the various embodiments. For instance, in a non-limiting embodiment, a user may employ user-computing device 156 to remotely provide, via communication network 152, a source image, control the generation of the novel target images, and view the generated target images. IGCD 158 may provide, via communication network 152, the target image to the user, via user-computing device 156.

It should be noted that IGCD 158 and/or user-computing device 156 may include virtually any computing device. For instance, at least one of IGCD 158 and/or user-computing device 156 may be a server computing device, a client computing device, a laptop computing device, a desktop computing device, a mobile computing device, and the like. In other embodiments, the functionality of each of IGCD 158 and user-computing device 156 may be implemented in a single computing device or a combination of multiple computing devices that includes additional computing devices not shown in FIG. 1B.

System 150 also includes a training database 154 that is also communicatively coupled to at least IGCD 158 and/or user-computing device 156, via communication network 152. Training database 154 may include training data employed to train the various machine-learning networks discussed herein.

Communication network 152 may be any communication network, including virtually any wired and or wireless communication technologies, wired and/or wireless communication protocols, and the like. It should be understood that communication network 152 may be virtually any communication network that communicatively couples a plurality of computing devices and databases in such a way as to enable users of computing devices to exchange information via the computing devices.

System 150 includes a plurality of machine-learning networks. In the embodiment shown in FIG. 1B, system 150 includes at least geometric flow network (GFN) 160, image completion network (ICN) 170, and loss network 180. Alternative embodiments may include more or less machine-learning networks. IGCD 158 may host, implement, or otherwise include such machine-learning networks. For instance, in the non-limiting embodiment shown in FIG. 1B, IGCD 158 hosts GFN 160, ICN 170, and loss network 180. In alternative embodiments, user-computing device 156 may host such machine-learning networks.

GFN 160, ICN 170, and/or loss network 180 may be deep learning networks (or simply deep networks). At least one of GFN 160, ICN 170, and/or loss network 180 may be an artificial neural network, such as a deep neural network. At least one of GFN 160 or ICN 170 may be an agent, such as a generalized artificial intelligence (AI) agent. In various embodiments, more or less machine-learning/deep learning networks are hosted via IGCD 158 and/or user-computing device 156. However, virtually any computing device that is communicatively coupled to training database 154 may be employed to train, implement, and/or host such deep-learning networks.

Figure 2A:
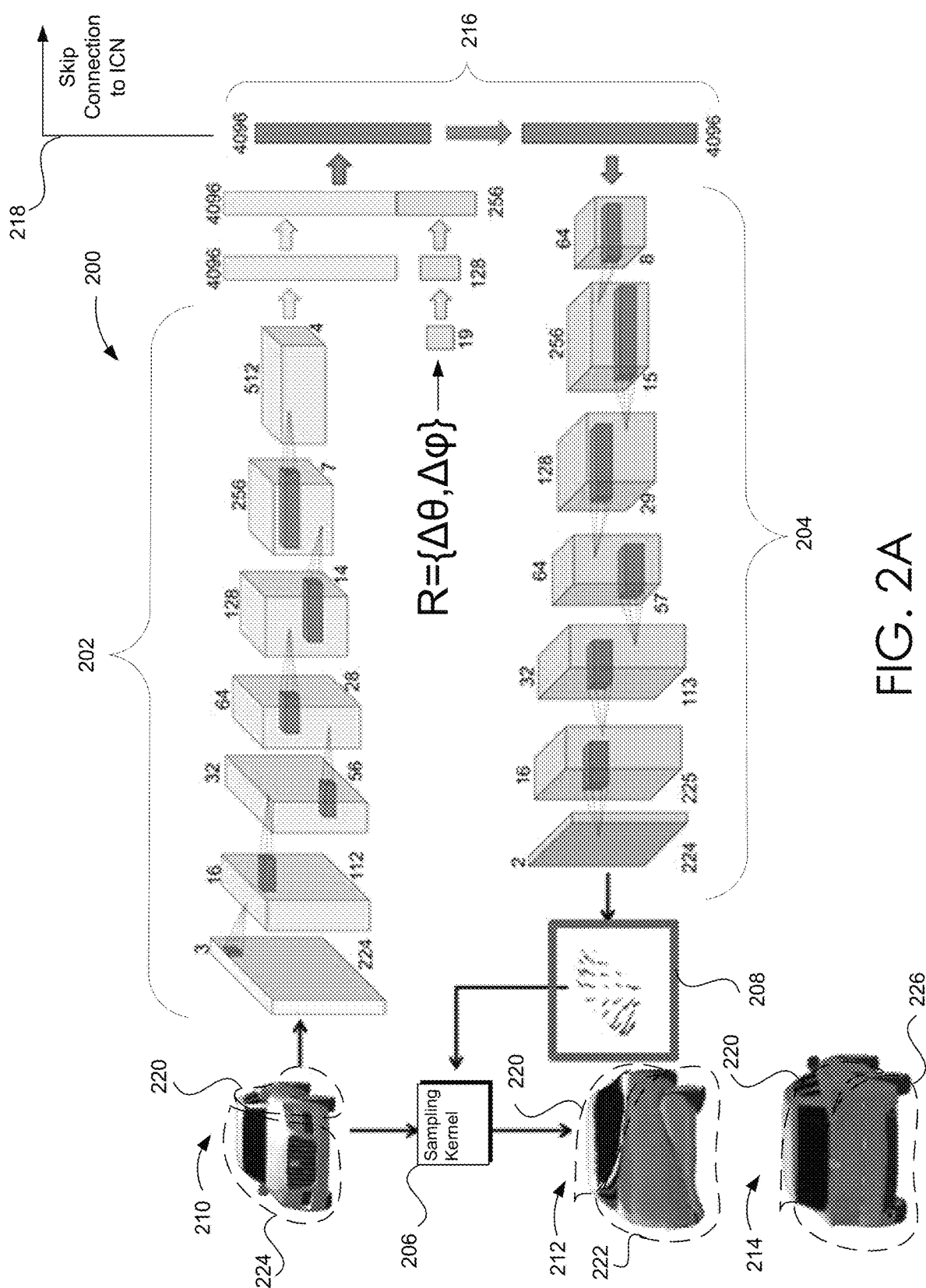
FIG. 2A illustrates an exemplary embodiment of a geometric flow network employing a geometric flow model that is consistent with the various embodiments presented herein.
Figure 2B:
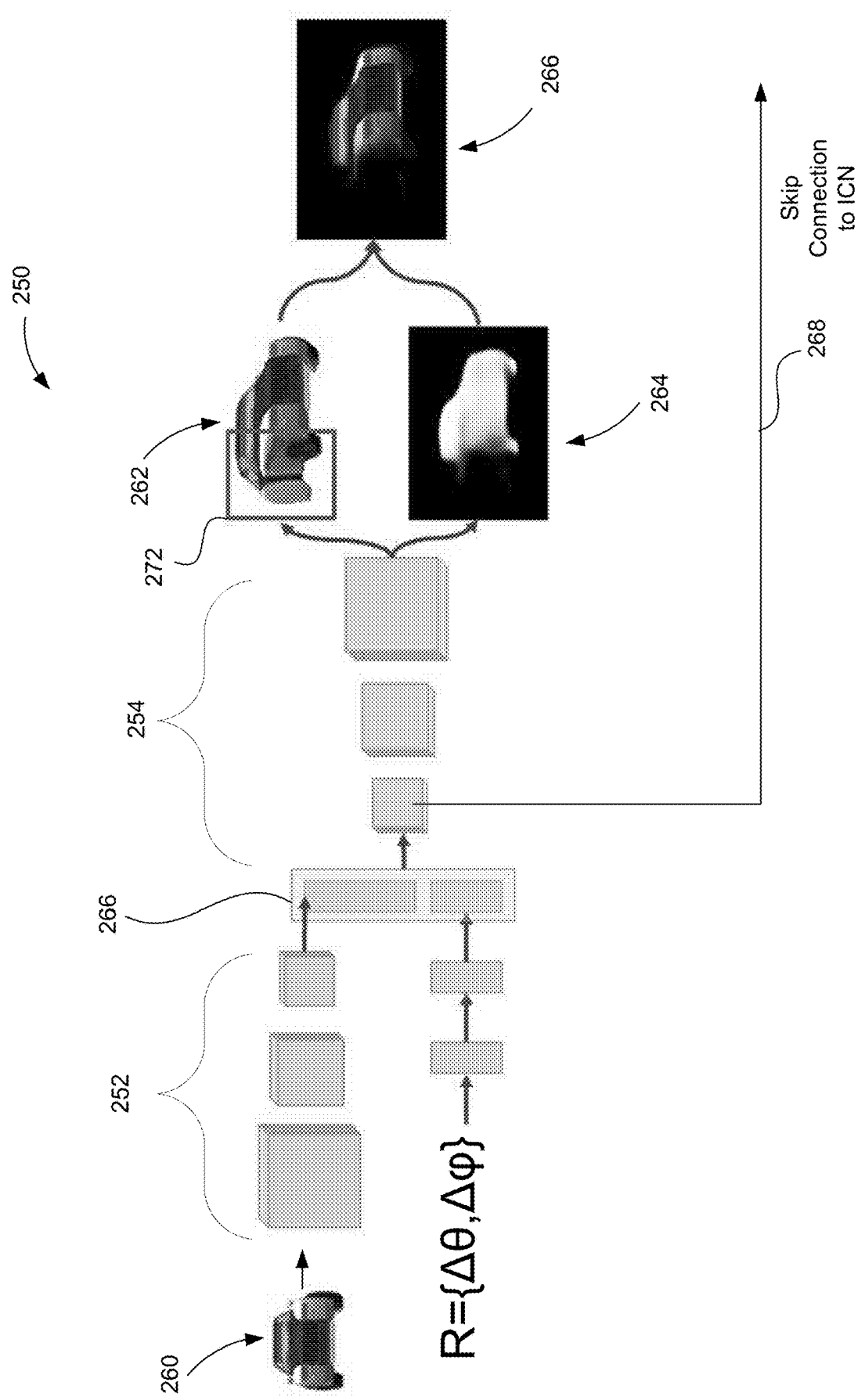
FIG. 2B illustrates an exemplary embodiment of a disocclusion-aware geometric flow network that generates a visibility map and is consistent with the various embodiments presented herein.

GFN 160 may include similar features, components, and/or functionality as GFN 200 of FIG. 2A and GFN 260 of FIG. 2B. However, briefly, GFN 160 is trained to generate an intermediate image, from the target viewpoint, based on a transformation of a 2D source image, from the source viewpoint. Due to disocclusion of one or more portions the 3D object, the intermediate image is incomplete. The ICN 170 is trained to generate the target image by generating a prediction (or hallucination) for the incomplete regions of the intermediate image. Loss network 180 may be trained and employed to trained the ICN 170 based on an adversarial loss model (or function) 182, the feature loss model (or function) 184, and the pixel-loss function model 186. Loss network 180 may be an adversarial-trained network.

In various embodiments described herein, loss network 180 may employ training data included in training database 154 to train ICN 170 and/or GFN 160. At least one of GFN 160 and/or ICN 170 may be a convolutional/deconvolutional network. Accordingly, these machine-learning networks may include a plurality of convolution (or encoding) layers and/or a plurality of deconvolution (or decoding) layers.

As discussed throughout, the workflow of system 150 for generating a target image from a novel target viewpoint includes receiving a 2D source image. FIG. 1B shows GFN 160 receiving a single 2D source image 164. Source image 164 includes a view of the 3D object (an automobile) from the source viewpoint Vs. In various embodiments, source image 164 is encoded via 2D data that lacks and/or does not include object information in the third spatial dimension. Furthermore, source image 164 is from a single viewpoint, i.e. the source viewpoint. GFN 160 does not require a 3D model of the object or image data of the object from multiple viewpoints.

In addition to source image 164, GFN 160 may receive one or more viewpoint parameters that indicate the target viewpoint $V_T=\{\theta_T, \phi_T\}$. For instance, the received viewpoint parameters may include one or more of $V_T=\{\theta_T, \phi_T\}$ and/or rotational transformation $R=V_T-V_S=\{\Delta\theta, \Delta\phi\}=\{\theta_T-\theta_S, \phi_T-\phi_T\}$. In at least one embodiment, the one or more viewpoint parameters includes one or more parameters indicating the source viewpoint, $V_S=\{\theta_S, \phi_S\}$.

Based on the 2D data encoding source image 164 and the one or more viewpoint parameters, GFN 160 generates an intermediate image 174. Intermediate image 174 includes an intermediate view of the object from the target viewpoint. The intermediate view of the object is a rotated view of the object, where the rotation is based on the rotational transformation.

A portion of the object is common to each of the views in source image 164 and the intermediate image 174. The boundaries of this common portion of the object are approximately demarcated via the hash marks 192 in source image 164 and via hash marks 194 in intermediate image 174. The GFN 174 is trained to rotationally transform (or rotate) the common region (indicated via hash marks 194) of intermediate image 174, relative to the common region (indicated via hash marks 192) of source image 164, without requiring a 3D model (or other 3D data) of the object.

More particularly and as discussed below, GFN 160 is trained to generate a flow field that maps regions (and thus pixel values) of source image 164 to corresponding regions (and thus corresponding pixel values) of the intermediate image based on the rotational transformation R. Note that source image 164 lacks 3D information regarding the object to assist with such a transformation. Rather, GFM 162 of GFN 160 is trained to perform such a transformation without the 3D data normally employed to perform such a rotational transformation, e.g. by explicitly rotationally transforming (or moving) pixel values via the flow field.

As also shown in FIG. 1B, the intermediate view of the object in intermediate image 174 includes a portion of the object that was occluded in the view of source image 164, but is disoccluded in intermediate view of intermediate image 174. The boundaries of the disoccluded portion (or previously occluded portion) of the objected are approximately demarcated via hash markings 196 in intermediate image 174. Thus, intermediate image 174 includes a region corresponding to the common portion (indicated via hash markings 194) of the object and another region corresponding to the disoccluded portion (indicated via hash markings 196) of the object.

Hash marks 194 approximately demarcate the boundaries of the common region of intermediate image 174. Likewise, hash marks 196 approximately demarcate the boundaries of the disoccluded region of intermediate image 174.

Note that the intermediate image 174 is an incomplete image due to the disocclusion of disoccluded portion 196. More specifically, the pixels included in the disoccluded region of intermediate image 174 have been masked out, not included, or otherwise set to a single value. The 2D data encoding source image 192 does not include (or lacks) information corresponding to the disoccluded portion 196 (i.e. the portion of the object that is non-visible/occluded from the source viewpoint but visible/disoccluded from the target viewpoint). Accordingly, if the information included in the source 164 is employed to generate the pixel values within the disoccluded region of intermediate image 196, the disoccluded region would be distorted.

In some embodiments, GFN 160 is a disocclusion-aware network. In such embodiments, GFN 160/GFM 162 is trained to generate a visibility map. That is to say, GFN 160 is trained to detect and/or determine which pixels in the intermediate image that correspond to the disoccluded portion of the object. That is to say, GFN 160 is a disocclusion-aware GFN that is enabled to determine the location pixels included in the disoccluded region of the intermediate image. The visibility map is essentially a pixel mask that is employed to update the intermediate image such that the pixel values included in the disoccluded regions are not erroneously predicted via the flow field applied to the source image. As shown in FIG. 1B, intermediate image 174 has been updated to mask out and/or not included pixels included in the disoccluded region. Thus, intermediate image 174 is an incomplete image.

The intermediate image 174 is provided to ICN 170 for image completion. Essentially, ICM 172 is trained to hallucinate (or predict) the disoccluded region of intermediate image 174. Essentially, the ICM 172 is trained to generate a prediction of the disoccluded portion of the object and/or a prediction for the disoccluded region of the intermediate image 174. The ICM 172 updates the incomplete region of intermediate image 174 with the prediction. As discussed herein, one or more skip connections 166 from the GFN 160 to ICN 170 may be employed to provide information, such as detected object features, from the various encoding/decoding layers in GFN 160 to various encoding/decoding layers of ICN 170.

ICM 172 generates target image 190 based on intermediate image 174 and the prediction of the disoccluded portion 198 of the object. Similar to intermediate image 174, target image 190 is from target viewpoint $V_T$. Target image 190 includes a target view of the object that includes the common portion of the object (as rotated from the source viewpoint $V_S$ via GFN 160), as well as a prediction (or hallucination) of the disoccluded portion of the object in the target image 190. More particularly, target image 190 includes the common portion of the intermediate image and a prediction for the disoccluded region of the intermediate image. Thus, ICN 170 may complete an incomplete intermediate image.

As discussed herein, additional skip connections from the encoding layers of ICN 170 to the decoding layers of ICN 170 (not shown in FIG. 1B) may be utilized to efficiently propagate information throughout ICN 170. ICN 170 may be additionally trained to remove artifacts in target image 190 that are introduced via the generation of the intermediate view 174 and/or the target image 190.

Training data, included in training database 154, may be employed to train one or more of these GFN 160, ICN 170, or loss network 180. More specifically, training data may be used to train a geometric flow model (GFM) 162 implemented via GFN 160 and an image completion model (ICM) 172 implemented via ICN 170. Such machine-learning networks may be trained via back-propagation techniques that rely on ground-truth data included in training database 154. Thus, in various embodiments, the training of at least one of GFN 160, ICN 170, or loss network 170 includes supervised learning. As described below, loss network 180 may implement at least an adversarial loss model 182, a feature loss model 184, and a pixel loss model 186 to train GFN 160 and/or ICN 170. The training data may be employed to train adversarial loss model 182 and feature loss model 184.

The adversarial loss model 182 may be trained to discriminate between natural images and synthesized images, i.e. generated images that include pixel values not directly based on signals generated via image sensors and/or cameras. Thus, adversarial loss model 182 may be a classifier model. For instance, the adversarial loss model 182 may be trained to generate an adversarial loss metric that discriminates between a natural image and a synthetic image.

As discussed above, ICN 170 may generate a complete image by predicting pixel values for incomplete regions of an incomplete image. The trained adversarial loss model 182 generates an adversarial loss metric based on the predicted pixel values. The adversarial loss metric indicates a probabilistic metric for whether the completed image is a natural or synthesized image. Adversarial loss model 182 may be trained via training data included in training database 154 of FIG. 1B. For instance, such training data may include a plurality of synthesized images and natural images.

Once trained, the adversarial loss model 182 and the GFM 162 may be employed to train the ICN 170 in an adversarial mode. For instance, when training the ICN 170, the trained GFN 160 may generate an incomplete image. The semi-trained ICN 170 may generate a complete image based on the incomplete image. During training, the weights of the ICM 172 may be adjusted to complete an image that "tricks" or "fools" the adversarial loss model into misclassifying the completed image as a natural image. Thus, the ICN 170 is trained to generate more "natural" predictions of the disoccluded portion of the objects.

Feature loss model 184 may be further employed in the training of ICN 170. For instance, each of the GFN 160 and ICN 170 may be trained to recognize various features in the objects. More specifically, the various convolutional layers in the networks may determine and/or detect object features. The feature loss model 184 may be employed when training ICN 170 to conserve recognized features in the prediction of the disoccluded portion of the object. More particularly, the feature loss model 184 generates a feature loss metric that discriminates between physical features included in an image.

The pixel loss model 186 may be employed to train the ICN 170. For instance, the pixel loss model 186 may generate a pixel loss metric that indicates various pixel-wise differences between images. The pixel loss metric may indicate pixel-wise comparisons of images, gradients of images, and the like. As discussed throughout, training the GFN 160 and/or ICN 170 may include one or more linear and/or nonlinear combinations of the trained adversarial loss model 182, the feature loss model 184, or the pixel loss model 186. The combinations may be parameterized via one or more hyperparameters.

Exemplary Geometric Flow Network

FIG. 2A illustrates an exemplary embodiment of a geometric flow network (GFN) 200 employing a geometric flow model (GFM) that is consistent with the various embodiments presented herein. GFN 200 is machine-learning network that is trained to generate an intermediate image based on a source image and one or more viewpoint parameters, such as but not limited to rotational transformation R. GFM 200 may include similar features, components, and/or functionality as GFN 160 of FIG. 1B. Training GFN 200 and/or a GFM (implemented via GFN 200) to generate an intermediate image is discussed in conjunction with at least process 820 of FIG. 8B. GFN 200 may be deep neural network, where the weights of the connections are trained via training data that includes ground-truth data. Thus, the GFM may include the trained weights. Back-propagation of one or more loss metrics may be employed to iteratively update the weights until training convergence.

GFN 200 includes a plurality of convolution (or encoding) layers 202 and a plurality of deconvolution (or decoding) layers 204. Convolution layers 202 may include image encoders and deconvolution layers 204 may include image decoders. Thus, GFN 200 may be a convolutional/deconvolutional (encoding/decoding) network. GFN 200 may also include one or more rotational layers 216. Note that the integer markings shown in the convolution/deconvolution layers 202/204 show values for the filter size and bit depth at the various layers. The various convolutional layers may be trained to detect and encode various features in an image. The various rotational layers 216 may be trained to rotationally transform features encoded via the convolution layers 204. The deconvolution layers 204 may be trained to reconstruct (or decode) the features rotated via the rotational layers 216. GFN 200 also includes one or more skip connections 218 to provide information an image completion network (now shown in FIG. 2A).

As shown in FIG. 2A, GFN 200 receives and/or is provided a source image 210 that includes a view of a 3D object from a source viewpoint. GFN 200 also receives and/or is provided a rotational transformation R (or other viewpoint parameters). GFN 200 generates intermediate image 212. More specifically, GFN 200 generates a flow field 208 that maps pixel locations in source image 210 to corresponding pixel locations in the target image 212 based on R. As discussed throughout, GFN 200 may be trained to generate flow field 208 without requiring 3D data regarding the object. A sampling kernel 206 is employed to determine the pixel values for intermediate image 212 based on flow field 208. In various embodiments, the sampling kernel may be a bilinear sampling kernel. For instance, the pixel values ($I_I^{i,j}$) for a pixel included in intermediate image 212 may be at least initially determined based on the generated flow filed (F) as, $$I_I^{i,j} = \sum_{(h,w) \in N} I_s^{h,w} \max(0, 1 - |F_y^{i,j} - h|) \max(0, 1 - |F_x^{i,j} - w|).$$

(i,j) are pixels indexes for the intermediate image and and $F_x^{i,j}$ and $F_y^{i,j}$ indicate the x and y coordinates of the intermediate image, N denotes the 4-pixel neighborhood of ($F_x^{i,j}$, $F_y^{i,j}$), and $I_S^{h,w}$ are pixel values in the source image ((h,w) are pixel indexes in the source image). During training of GFN 200, the various convolution/deconvolution layers 202/204 may be trained to explicitly move pixels in the source image (to be locations in the intermediate image) without requiring explicit information of the 3D geometry of the object. Thus, when trained, GFN 200 is enabled to predict how pixels in the source image are transformed when a view transforms from the source viewpoint to the target viewpoint.

Each of source image 210 and intermediate image 212 includes a common portion of the object. Hash markings 220 approximately demarcate the boundaries of the common portion of the object in source image 210 and intermediate image 212. Thus, hash markings 220 approximately bound the pixels included in the common region of intermediate image 212. Note the rotational transformation, generated via flow field 208 and sampling kernel 206 of the common region of intermediate image 212, as compared to source image 210. The source image 210 includes another portion of the object (indicated via hash markings 224) that is occluded in the target viewpoint.

Intermediate image 212 includes a disoccluded portion of the object (a portion of the object that was occluded in the source image 220) but disoccluded from the target viewpoint. Hash markings 222 approximately demarcate the boundary for the pixels included in the disoccluded portion of intermediate image 212.

FIG. 2A also shows a ground-truth target image 214, i.e. the "true" image of the object from the target viewpoint. The ground-truth image 214 includes the common portion (indicated hash markings 222) and the disoccluded portion (via hash markings 226) of the object. Because source image 210 does not include the 3D information regarding the disoccluded portion of the object (i.e. the portion of the object that is non-visible/occluded from the source viewpoint but visible/disoccluded from the target viewpoint), the disoccluded region of the intermediate image 212 is distorted, as compared to the disoccluded regions of the ground-truth image 214. Thus, in various embodiments, GFN 200 may be trained as a disocclusion-aware network that generates a visibility map to mask off such distorted (or erroneous) pixels.

FIG. 2B illustrates an exemplary embodiment of a disocclusion-aware GFN 250 that generates a visibility map 264 and is consistent with the various embodiments presented herein. Various embodiments of training a disocclusion-award GFN are discussed in conjunction with at least process 820 of FIG. 8B. Disocclusion-aware GFN 250 may be a deep convolution/deconvolution neural network, where the GFM includes the trained weights. Disocclusion-aware GFN 250 may include similar features, components, and/or functionality as GFN 160 of FIG. 1B and GFN 200 of FIG. 2A. For instance, disocclusion-aware GFN 250 includes a plurality of convolution layers 252, rotational layers 266, and deconvolution layers 254. In addition to predicating a pixel the transformation/rotation/movement of pixels in the source image to the intermediate image, disocclusion-aware GFN 250 is trained to predict and/or determine the location of pixels included in a disocclusion region of an intermediate image. Furthermore, the disocclusion-aware GFN 250 masks out, or explicitly does not include, such disoccluded pixels in the intermediate pixels.

Disocclusion-aware GFN 250 receives a source image 260 (from a source viewpoint) and one or more viewpoint parameters, such as but not limited to rotational transformation R. Disocclusion-aware GFN 250 generates intermediate image 262, as discussed in conjunction of GFN 200 of FIG. 2A. Similar to intermediate image 212 of FIG. 2A, intermediate image 262 of FIG. 2B includes a disoccluded region (indicated via the box 272) that is distorted due to lack of information in the 2D source image 260.

Disocclusion-aware GFN 250 is trained to generate a visibility map 264. Visibility map 264 may be a binary image with a binary view of the common portion of the object from the target viewpoint. More particularly, pixels associated with the common portion of the object (or common region of the intermediate image 262) may be set to a first value and pixels associated with the disoccluded portion of the object (or the disoccluded region of intermediate regions 262) are set to another value. For instance, as shown in FIG. 2B, pixels associated with the common portion of the object in visibility map 164 are set to "1" (or "white") and pixels associated with the disoccluded portion are set to "0" (or "black"). Thus, a masking operation (pixel-wise AND operation) may be performed to mask off (and/or zero-out) the pixel values for pixels included in the disocclusion region of intermediate image 262.

Figure 3A:
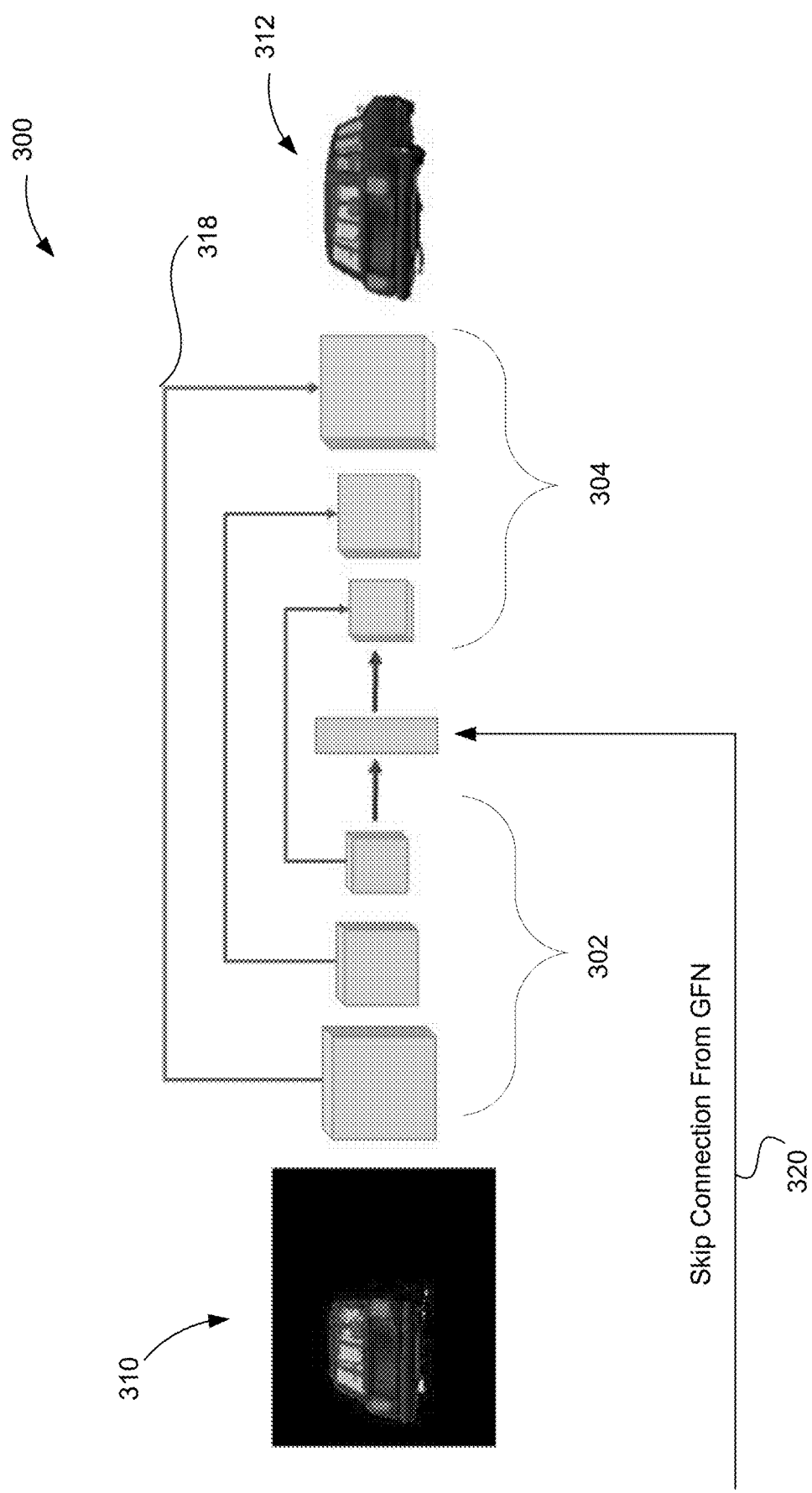
FIG. 3A illustrates an exemplary embodiment of an image completion network employing an image completion model that is consistent with the various embodiments presented herein.

In the various embodiments, a GFN, such as but not limited to disocclusion-aware GFN 250 may include one or more skip connections that feed forward information to an ICN, such as but not limited to ICN 200 of FIG. 3A. FIG. 2B shows one non-limiting embodiment of such a skip connection: skip connection 268. Note that disocclusion-aware GFN 250 may include additional skip connections not shown in FIG. 2B.

Skip connection 268 be equivalent to, feed into, input into, or other otherwise be provided to ICN 300, of FIG. 3A, via skip connection 320. Such skip connections may couple, or concatenate, mid-level convolution layers in a GFN to middle convolution layers in a ICN. Such skips layers may provide information regarding detected features of the object to the ICN. Providing information, to an ICN, regarding the object features detected a GFN may be important because pixels associated with the features are masked from the intermediate view, via the visibility map. That is to say, the ICN does not have access to the information that encodes such features. For instance, various high-level object features (colors, edges, corners, macro-structures, and the like) may be detected via convolution layers in a GFN. The one or more skip connections may provide such detected features to the convolution layers of the ICN. Thus, the ICN may employ information provided via the skip connections to preserve such features when generating a prediction for the disoccluded portion of the object.

As shown in FIG. 2B, pixels associated with the background region of the image are also set to the value of the disoccluded pixels. Essentially, visibility map 264 may be a mask employed to update intermediate image 262. Upon such a masking operation, updated intermediate image 266 is generated such that the disoccluded portion of the object is not included (and/or masked out) in updated intermediate image 266. Various embodiments for generating a visibility map are discussed in conjunction with at least process 620 of FIG. 6B.

Figure 2C:
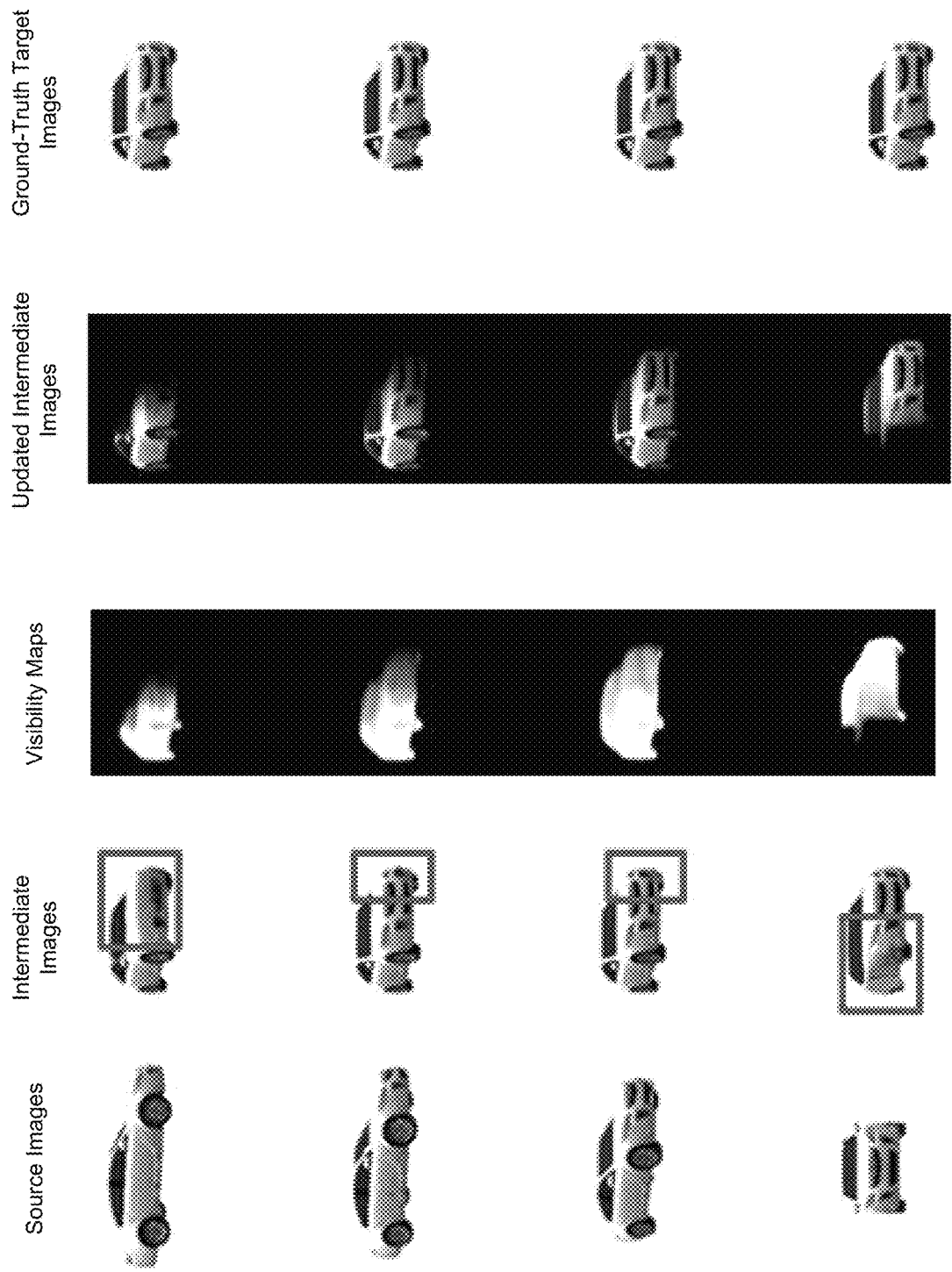
FIG. 2C shows various source images and ground-truth target images, as well as visibility maps and intermediate images generated by the various embodiments discussed herein.

FIG. 2C shows various embodiments of source images and ground-truth target images, as well as visibility maps, intermediate images, and updated intermediate images generated by the various embodiments discussed herein. The intermediate images, visibility maps, and updated intermediate images may be generated by a disocclusion-aware GFN, such as but not limited to GFN 250 of FIG. 2B. Note that the disoccluded region of the intermediate images is indicated via the box in the intermediate image column. The updated intermediate images have been updated via viability map applied as a mask to the corresponding intermediate image. The ground-truth images may be employed in training the GFM and/or the GFN.

Exemplary Image Completion Network

FIG. 3A illustrates an exemplary embodiment of an image completion network (ICN) 300 employing an image completion model (ICM) that is consistent with the various embodiments presented herein. ICN 300 is machine-learning network that is trained to predict (or hallucinate) at least a visual representation of a disoccluded portion of an object based on an incomplete image, such as but not limited to an intermediate image generated via a trained GFN. ICN 300 may be additionally trained to generate a target image based on the prediction of the disoccluded portion of the object and the intermediate image. Thus, ICN network may be trained to complete an incomplete intermediate image, such as but not limited intermediate image 174 of FIG. 1B. Adversarially training ICN 300 and/or an ICM to complete an intermediate image is discussed in conjunction with at least process 860 of FIG. 8C. The ICM may include the trained weights.

Similar to GFN 200 and disocclusion-aware GFN 250 of FIGS. 2A and 2B respectively, ICN 300 may be machine-learning network, where the weights of the connections are trained via training data. ICN 300 includes a plurality of convolution (or encoding) layers 302 and a plurality of deconvolution (or decoding) layers 304. Thus, ICN 300 may be a convolutional/deconvolutional network. ICN 300 also includes one or more skip connections 318 between the convolution layers 302 and the deconvolution layers 304. Another skip connection 320 may provide information from a GFN, such as but not limited to GFN 160 of FIG. 1B, GFN 200 of FIG. 2A, or GFN 250 of FIG. 2B. ICN 300 receives an intermediate image 310 from a GFN. For instance, skip connections such as but not limited to skip connections 218 and 268 may be equivalent to, feed into, input into, or otherwise be provided to ICN 300 via skip connection 320.

The intermediate image 310 is from the target viewpoint. GFN 300 generates a target image 312 from the target viewpoint. The target image 312 includes the common portion of the object (included in incomplete intermediate image 310), as well as the prediction for the disoccluded portion (not included in incomplete intermediate image 310).

Figure 3B:
FIG. 3B shows various incomplete intermediate images, target images, and ground-truth target images, generated by the various embodiments discussed herein.
Figure 3B:
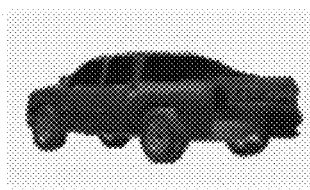
Figure 3B:
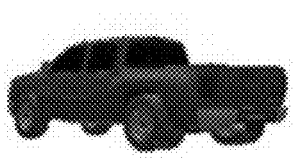
Figure 3B:
Figure 3B:
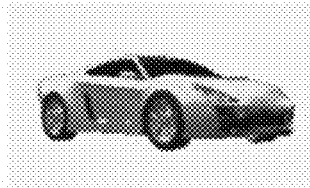
Figure 3B:
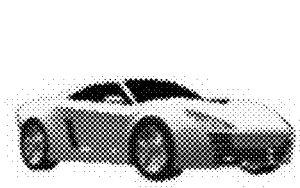
Figure 3B:
Figure 3B:
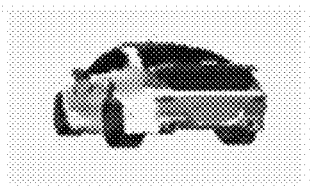
Figure 3B:
Figure 3B:
Figure 3B:
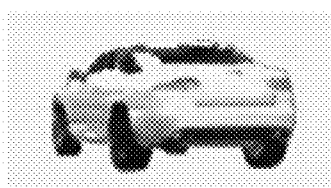
Figure 3B:
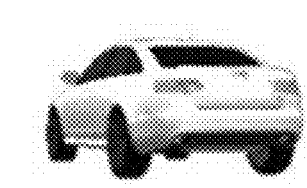
Figure 3B:
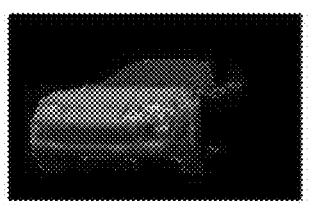
Figure 3B:
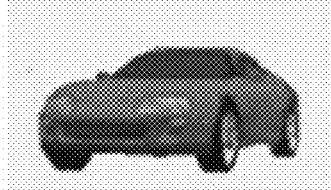
Figure 3B:
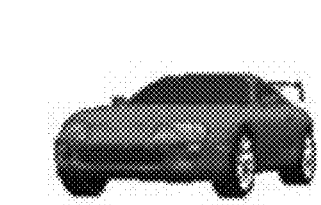
Figure 3B:
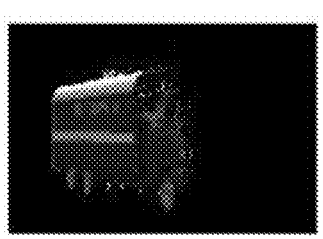
Figure 3B:
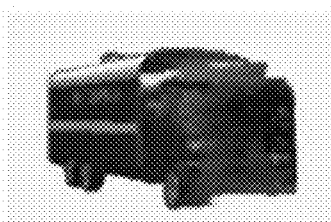
Figure 3B:
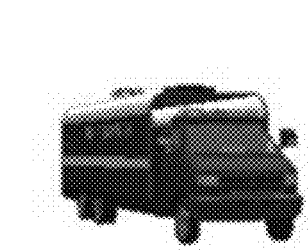

FIG. 3B shows various incomplete intermediate images, target images, and ground-truth target images, generated by the various embodiments discussed herein. For instance, the intermediate images are incomplete intermediate images and may be generated via a disocclusion-aware GFN, such as but not limited to disocclusion-aware GFN 250 of FIG. 2B. The target images may be generated by an ICN, such as but not limited to ICN 300 of FIG. 3A. The ground-truth target images may be employed to train the GFN and/or the ICN.

Figure 4:
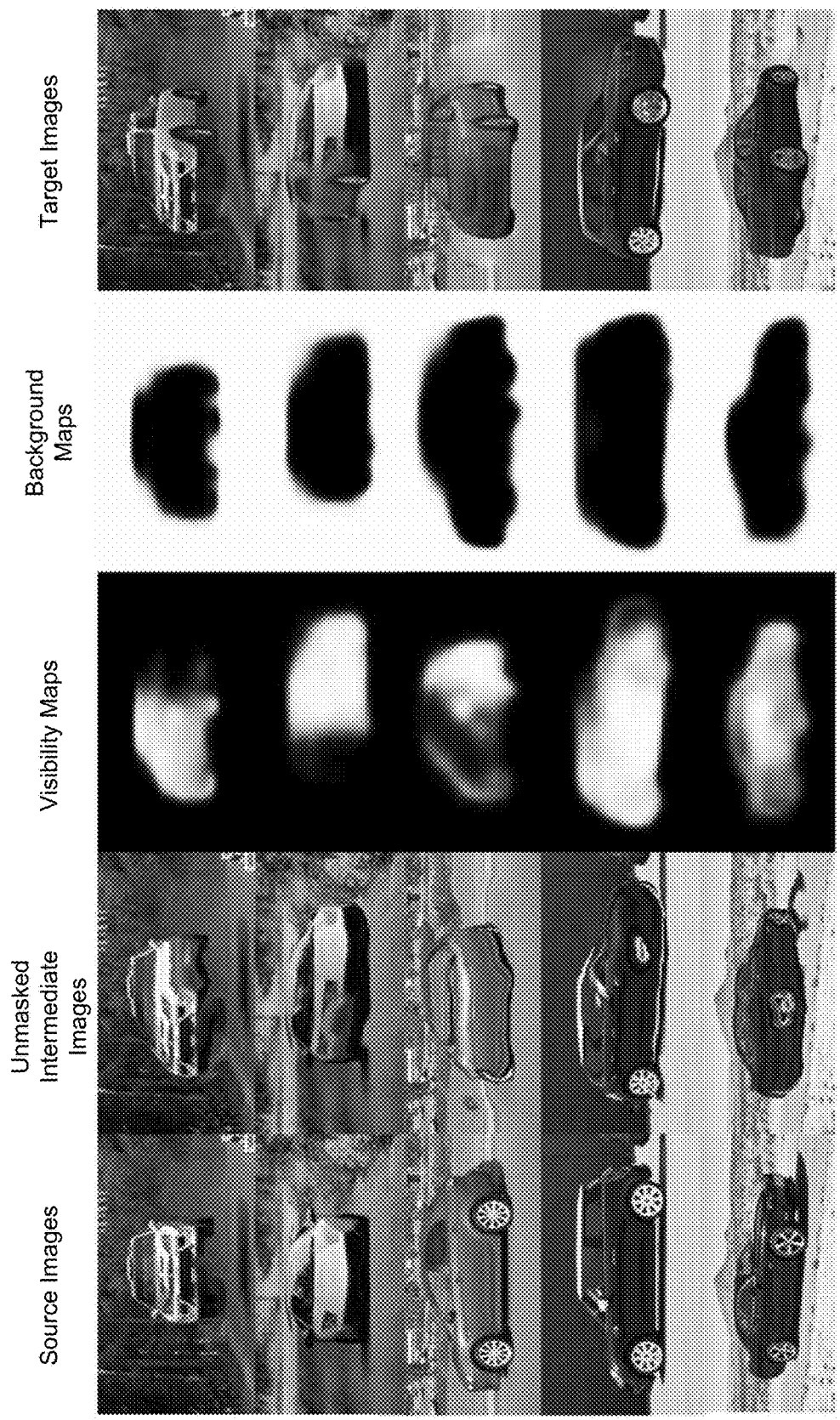
FIG. 4 shows various source images, unmasked intermediate images, visibility maps, background maps, and target images generated by the various embodiments discussed herein.

FIG. 4 shows various source images, unmasked intermediate images, visibility maps, background maps, and target images generated by the various embodiments discussed herein. The unmasked intermediate images, visibility maps, and the background maps may be generated by one of the various embodiments of a GFN as discussed herein. The corresponding visibility map and background map have not been applied to the unmasked intermediate images. The target images may have been generated by one of the various embodiments of an ICN as discussed herein. Upon updating the unmasked intermediate images by masking the various regions of the intermediate image via visibility maps and background maps, an ICN may complete the incomplete intermediate image to generate the target image.

Generalized Processes for Generating Novel Views of Three-Dimensional Objects

Processes 500-860 of FIGS. 5-8C will now be discussed. Briefly, processes 500-860 may be employed to generate novel views of 3D objects, as discussed in conjunction with the various embodiments herein. Such processes may be implemented, executed, or otherwise performed via a single and/or a combination of computing devices, such as but not limited to user-computing device 156 of FIG. 1B, IGCD 158 of FIG. 1B, or computing device 900 of FIG. 9.

Figure 5:
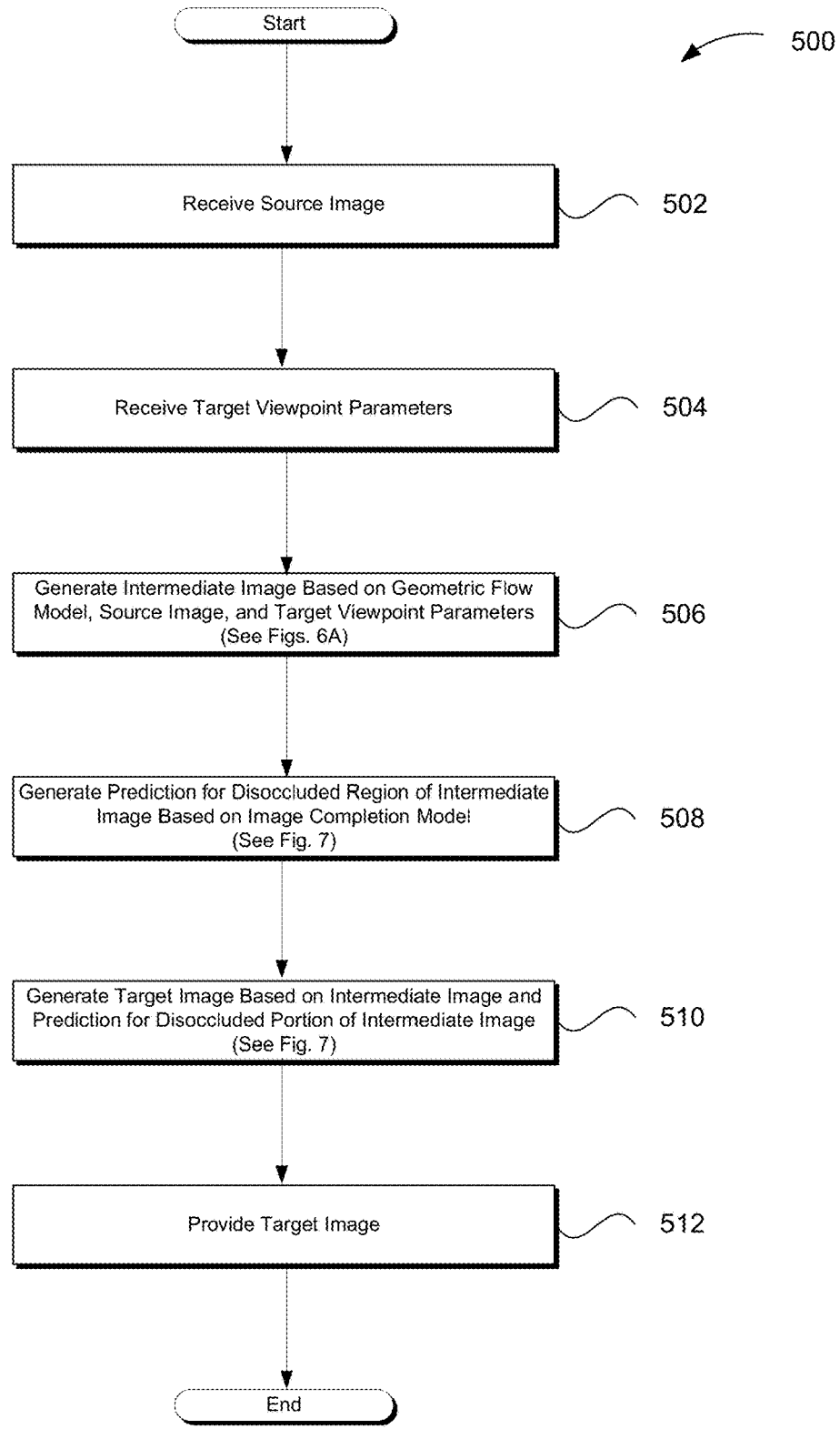
FIG. 5 illustrates one embodiment of a process flow for generating a novel target image that is consistent with the various embodiments presented herein.

FIG. 5 illustrates one embodiment of a process flow for generating a novel target image that is consistent with the various embodiments presented herein. The target image may include a target view of a 3D object. The target image is from a target viewpoint. Process 500 begins after a start block, at block 502, where a source image is received. The source image may be received by virtually any means, including but not limited to via a communication network. For instance, FIG. 1B shows source image 164 being received via communication network 152. The source image may include a source view of the object. In various embodiments, the source image is encoded in 2D data. The source view is from a source viewpoint and includes a common portion of the object. At block 504, one or more target viewpoint parameters are received. The one or more target viewpoint parameters may indicate a target viewpoint. For instance, the target viewpoint parameters may include target viewpoint Vs and/or a rotational transformation R.

At block 506, an intermediate image is generated. Various embodiments for generating an intermediate image are discussed in conjunction with at least process 600 of FIG. 6A. However, briefly here, the intermediate image may be based on the received source image and the one or more viewpoint parameters. More specifically, the intermediate image may be based on the 2D data that encodes the source image. The intermediate image includes an intermediate view of the object that is from the target viewpoint. The intermediate view includes the common portion of the object, as well as a disoccluded portion of the object that is occluded in the source view of the object. The intermediate image includes a common region corresponding to the common portion of the object and a disoccluded region corresponding to the disoccluded portion of the object. In at least one embodiment, the intermediate image is an incomplete image because the pixels included in the disoccluded region have been masked via a visibility map.

The intermediate image may be generated via a trained generation flow network (GFN) and/or a trained geometric flow network (GFM). For instance, FIG. 1B shows intermediate image 174 generated via GFN 160. Intermediate image 174 is an incomplete intermediate image that includes a common region (indicate via hash marks 194) and disoccluded region (indicated via hash mark 196). The pixels included in the disoccluded region have been masked via a visibility map generated by GFN 160. The GFM may be a disocclusion-aware GFN trained to generate the visibility map.

At block 508, a prediction for the disoccluded region of the intermediate image is generated. Various embodiments for generating a prediction for a disoccluded region are discussed in conjunction with at least process 700 of FIG. 7. However, briefly, the incomplete intermediate image may be completed to include a prediction for the masked off disoccluded region. The intermediate image may be updated to include the prediction for the disoccluded region. The predictions for the disoccluded region may be generated via a trained image completion network (ICN) and/or an image completion model (ICM).

At block 510, a target image is generated. Various embodiments for generating a prediction for a disoccluded region are discussed in conjunction with at least process 700 of FIG. 7. However, briefly here, the target image is based on the intermediate image, as well as the prediction for the disoccluded region of the intermediate image. As such, the target image is from the target viewpoint. More particularly, the target image includes the common region of the intermediate image and the prediction for the disoccluded region of the intermediate image.

FIG. 1B shows target image 190 that is generated via ICN 170. The target image 190 includes the common region of the intermediate image indicated via hash marks 194 and the prediction for the disoccluded region of the intermediate image indicated via hash marks 198. Thus, a trained ICN/ICM may complete an incomplete intermediate image. At block 512, the target image is provided. The target image may be provided to a user by virtually any means, including but not limited to a communication network. In at least one embodiment, the target image is displayed on a display device of a computing device, such as but not limited to user-computing device 156 and/or IGCD 158 of FIG. 1B. Process 500 may terminate and/or return a calling process.

Figure 6A:
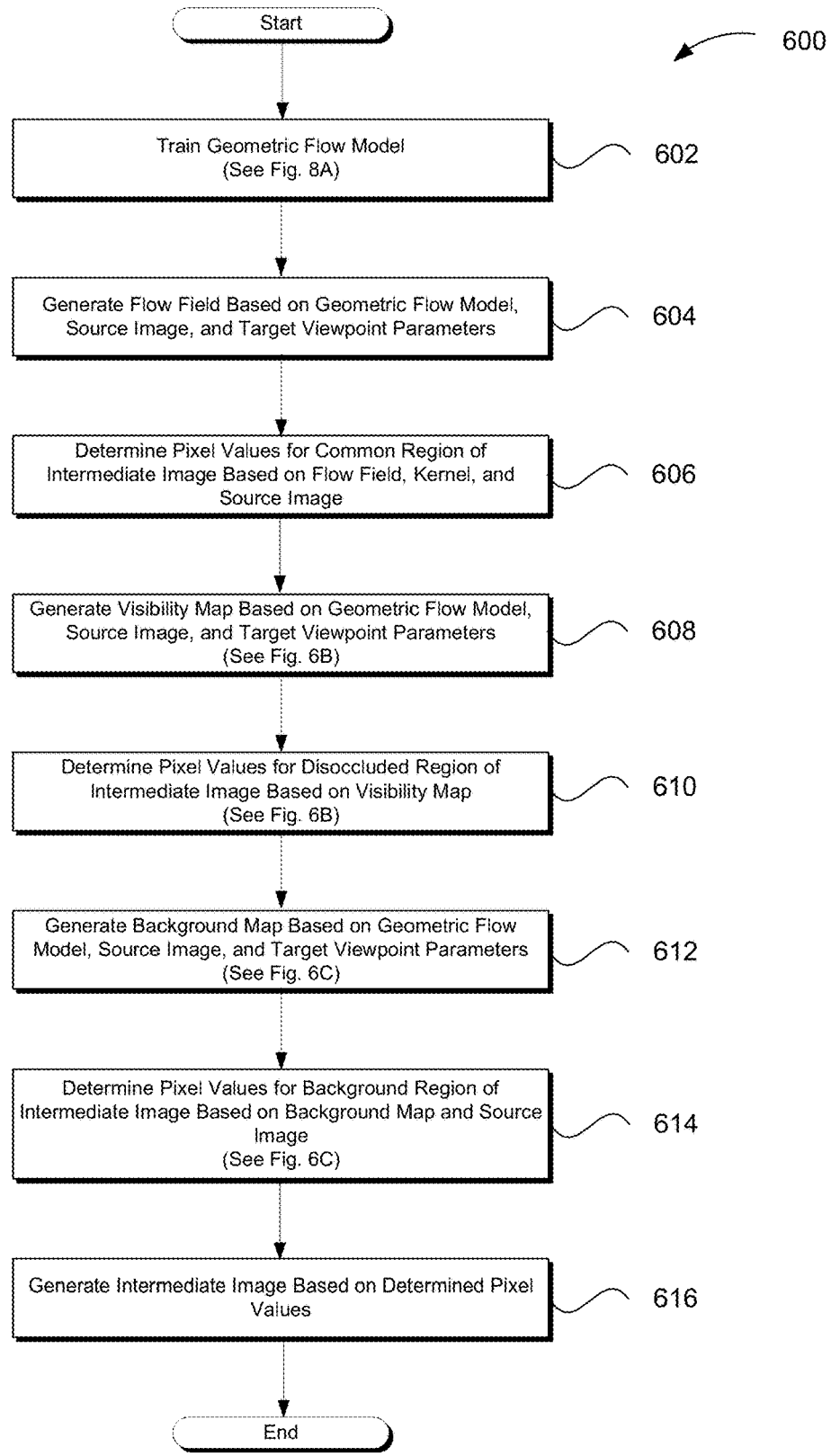
FIG. 6A illustrates one embodiment of a process flow for generating an intermediate image that is consistent with the various embodiments presented herein.

FIG. 6A illustrates one embodiment of a process flow for generating an intermediate image that is consistent with the various embodiments presented herein. Process 600 begins, after a start block, at block 602 where a GFM is trained. In various embodiments, training a GFM may include training a GFN that implements the GFM. Various embodiments for training a GFM and/or GFN are discussed in conjunction with at least process 820 of FIG. 8B. As discussed throughout, the GFN may be a disocclusion-aware GFN. Similarly, the GFM may be a disocclusion-aware GFM.

At block 604, a flow field is generated based on the generated/trained GFM, a source image, and one or more target viewpoint parameters. In the various embodiments, the flow field maps regions of the source image that correspond to the object to corresponding regions of an intermediate image based on a rotational transformation indicated by the one or more target viewpoint parameters. The trained GFN and/or GFM may generate the flow field. For instance, FIG. 2A shows flow field 208, as generated via GFN 200.

At block 606, pixel values for pixels included in at least the common region of the intermediate image are determined based on the flow field, a kernel, and the source image. The kernel may be a bilinear sampling kernel. In some embodiments, the pixel values for the pixels included in the disoccluded region of the intermediate image are also determined at block 606. Because the flow field maps regions of the source image to corresponding regions of the intermediate image, determining the pixel values for the intermediate image may be based on the 2D data (i.e. source image pixel values) encoding the corresponding regions of the source image.

At block 608, a visibility map is generated. The visibility map may be based on the GFM, the source image, and the one or more target viewpoint parameters. Various embodiments for generating a visibility map are discussed in conjunction with at least process 620 of FIG. 6B. However, briefly here, a disocclusion-aware GFN may generate the visibility map. For instance, FIG. 2B shows disocclusion-aware GFN 250 generating visibility map 264.

At block 610, pixel values for the disoccluded region of the intermediate image are determined based on the visibility map. For instance, the visibility map may be employed as a mask. Various embodiments for determining pixel values for the disoccluded region of the intermediate image are discussed in conjunction with at least process 620 of FIG. 6B. FIG. 2B shows determined pixel values for a disoccluded region of intermediate image 266, i.e. the pixel values are set to a single value indicating black in intermediate image 266.

As shown in FIG. 2A, the disoccluded region (indicated via hash marks 222) of intermediate image 212 is distorted. To avoid such distortion within the intermediate image, the visibility map may be employed as a mask to mask off pixels corresponding to the disoccluded portion of the object within the intermediate image. That is to say, pixels included in the disoccluded region of the intermediate image are set to a single value ("0" corresponding to black), such that the intermediate image is an incomplete image (e.g. intermediate image 266). In other embodiments, the pixels included in the disoccluded region may be set to "0" corresponding to white—as shown in intermediate image 174 of FIG. 1B.

At block 612, a background map is generated. The background map may be based on the GFM, the source image, and the one or more target viewpoint parameters. Various embodiments for generating a background map are discussed in conjunction with at least process 640 of FIG. 6C. However, briefly here, a background map may be a background mask. For instance, FIG. 4 shows various background masks generated by a trained GFN.

At block 614, pixel values for the background region of the intermediate image are determined based on the background map and the source mask. Various embodiments for determining pixel values for the background region of the intermediate image are discussed in conjunction with at least process 640 of FIG. 6C. However, briefly here, a pixel value for each of the pixels included in the background region of the intermediate image may be determined based on the background region of the source image and the background map. At block 616, the intermediate image may be determined based on the various determined pixel values. For instance, FIG. 2C shows various embodiments of intermediate images generated by processes consistent with process 600. Process 600 may terminate and/or return a calling process.

Figure 6B:
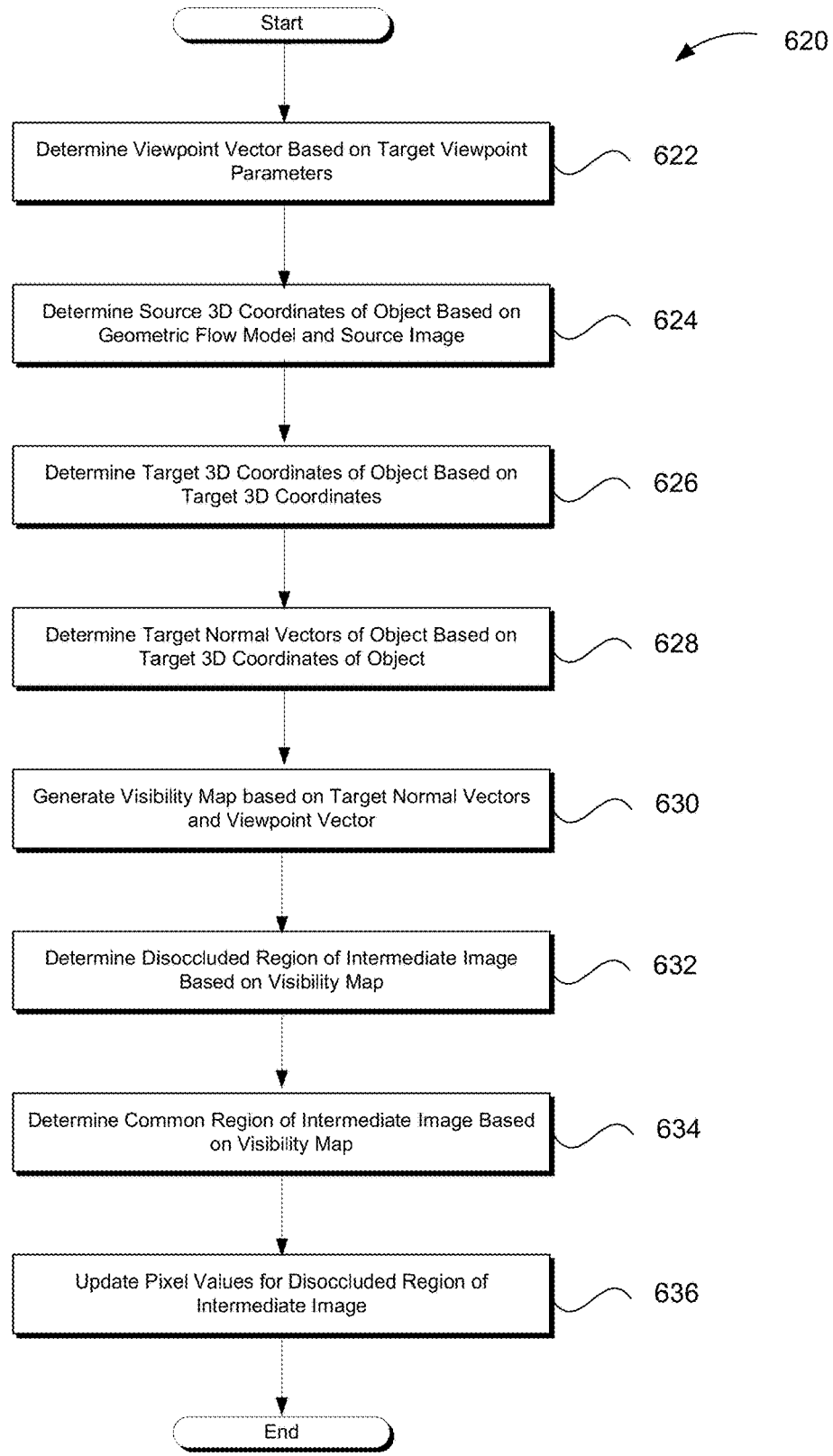
FIG. 6B illustrates one embodiment of a process flow for determining pixel values for a disoccluded region of an intermediate image that is consistent with the various embodiments presented herein.

FIG. 6B illustrates one embodiment of a process flow for determining pixel values for a disoccluded region of an intermediate image that is consistent with the various embodiments presented herein. Process 620 begins, after a start block, where a viewpoint vector is determined. The viewpoint vector is based on the one or more viewpoint parameters. The viewpoint vector may be a vector pointing from the target viewpoint to an origin of the coordinate system that is used to define the source viewpoint and the target viewpoint. In at least one embodiment, the viewpoint vector is a vector pointing from the "center of the camera" observing the target viewpoint. The viewpoint vector may be referenced as $\vec{c} \in \mathbb{R}^3$.

At block 624, source 3D coordinates of the object are determined based on the GFM and the source image. The source 3D coordinates are the 3D spatial coordinates for each pixel corresponding to the portions of the object that are visible in the source image. The GFN is trained to determine the source 3D coordinates. The source 3D coordinates may be referenced as $\vec{x}_S^{(i,j)} \in \mathbb{R}^4$, where (i,j) are pixel indexes for the source image.

At block 626, the target 3D coordinates of the object are determined based on the source 3D coordinates and the one or more target viewpoint parameters. The target 3D coordinates are the 3D spatial coordinates for pixels corresponding to the object from the target viewpoint. In at least some embodiments, to determine the target 3D coordinates, the rotational transformation R is applied to the source 3D coordinates for pixels in the source image corresponding to the object. A perspective projection (P) from the viewpoint is then performed on the rotated coordinates to determine the target 3D coordinates.

At block 628, the target normal vectors of object are determined based on the target 3D coordinates of object. The target normal vectors may be the surface normal vectors of the object from the target viewpoint. At block 630, the visibility map is determined based on the target normal vectors of object and the viewpoint vector. Basically, at block 630, the dot product between each of the target normal vectors and the viewpoint vector is determined. If the dot product is positive, the point on the surface is pointing toward the surface (and is thus visible). Accordingly, the corresponding pixel in the visibility map is set to 1. Otherwise, the corresponding pixel value is set to 0. The visibility map may be represented as $M_{vis} \in [0,1]^{H \times W}$. The visibility map may generated via:

$$M_{vis}^{(PR\theta \vec{x}_S^{(i,j)})^h, (PR\theta \vec{x}_S^{(i,j)})^w} = \begin{cases} 1 & \text{if } \vec{c}^T R(\theta) \vec{n}_s^{(i,j)} > 0 \\ 0 & \text{otherwise} \end{cases}.$$

$\vec{n}_S^{(i,j)}$ represents the surface normal vectors for pixel (i,j) in the source image. The superscripts (h,w) represent pixel indexes in the visibility map. $R(\theta) \in \mathbb{R}^{3 \times 4}$ represents a rotation matrix based on the target viewpoint parameters and $P \in \mathbb{R}^{3 \times 3}$ is perspective projection matrix.

At block 632, the disoccluded region of the intermediate image is determined based on the visibility map $M_{vis}$. At block 634, the common region of the intermediate image is determined based on the visibility map $M_{vis}$. At block 636, the pixels values for the disoccluded region of the intermediate image are updated. Blocks 632, 634, 636 may include employing the visibility map as a mask on the intermediate image. Accordingly, the intermediate image (I) may be updated via blocks 632, 634, and 636 as:

$$I = I \odot M_{vis}.$$

The operator $\odot$ is a pixel-wise AND operator. Process 620 may terminate and/or return a calling process.

Figure 6C:
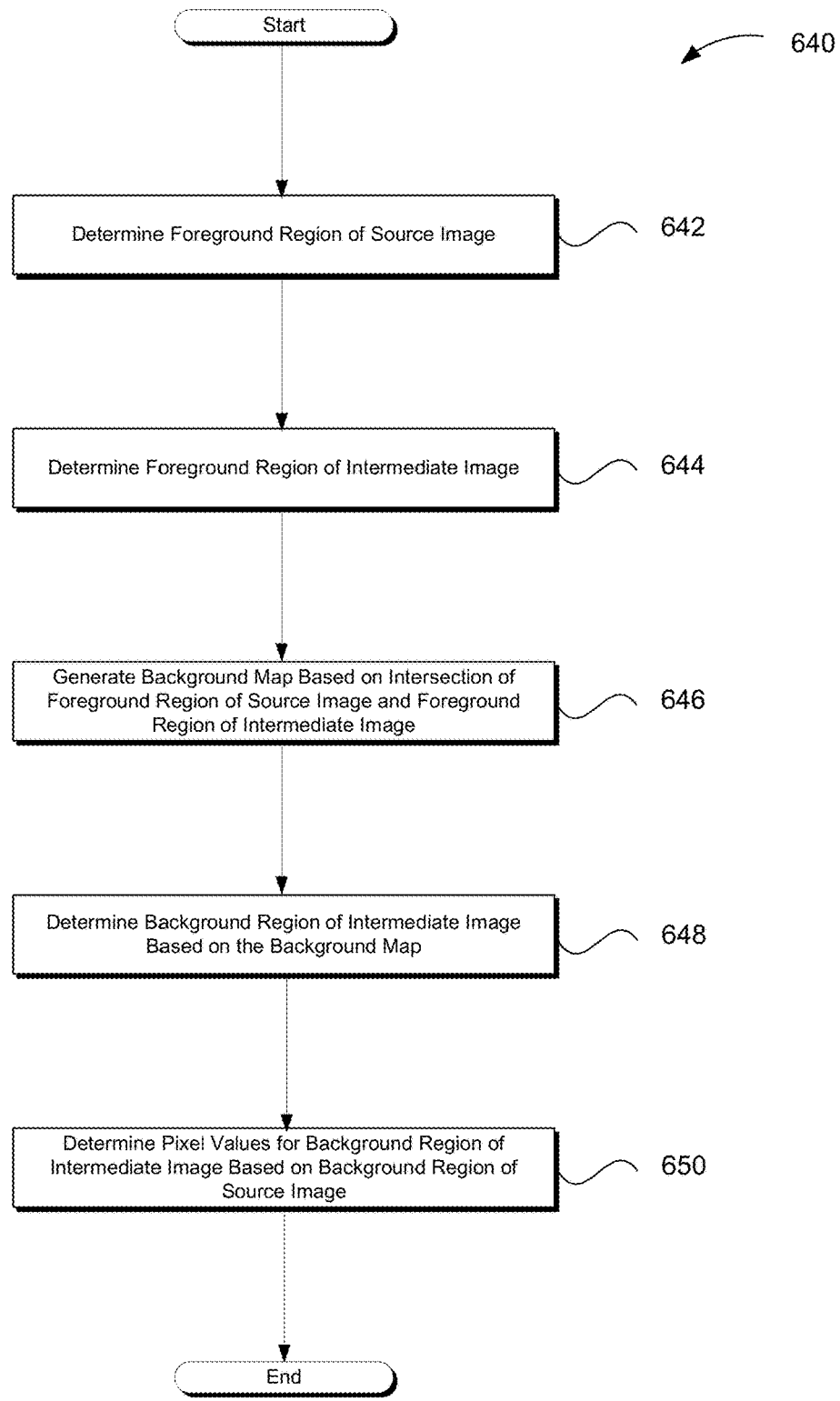
FIG. 6C illustrates one embodiment of a process flow for determining pixel values for a background region of an intermediate image that is consistent with the various embodiments presented herein.

FIG. 6C illustrates one embodiment of a process flow for determining pixel values for a background region of an intermediate image that is consistent with the various embodiments presented herein. Process 640 begins, after a start block, at block 642 where the foreground region of the source image is determined. The foreground region of the source image may include each of the pixels corresponding to the object in the source image. For instance, the trained GFN may be trained to determine foreground and background regions of a source image. At block 644, the foreground region of the intermediate image is determined. Similar to the foreground region of the source image, the foreground region of the intermediate image may include each of the pixels corresponding to the object in the intermediate image.

At block 646, a background map is generated based on the intersection of the foreground region of the source image and the foreground region of the intermediate image. The background map may be a background mask that masks away the background region of the intermediate image. For instance, FIG. 4 shows various embodiments of background maps generated by a trained background-aware GFN. In one embodiment, the map may be represented as $$M_{BG}^{i,j} = [B_S^{i,j} \cap B_I^{i,j}]$$

$B_S^{i,j}$ is a background mask for the source image (generated via block 642) and $B_I^{i,j}$ is a background mask for the intermediate image (generated via block 644).

At block 648 the background region of the intermediate image is determined based on the background map. For instance, the background map may be used as a mask to mask off the background region of the intermediate image. At block 650 the pixel values for the background region of the intermediate image are determined based on the background region of the source image. Accordingly, the intermediate image (I) may be updated via $$I = I \odot M_{BG}.$$

Process 640 may terminate and/or return a calling process.

Figure 7:
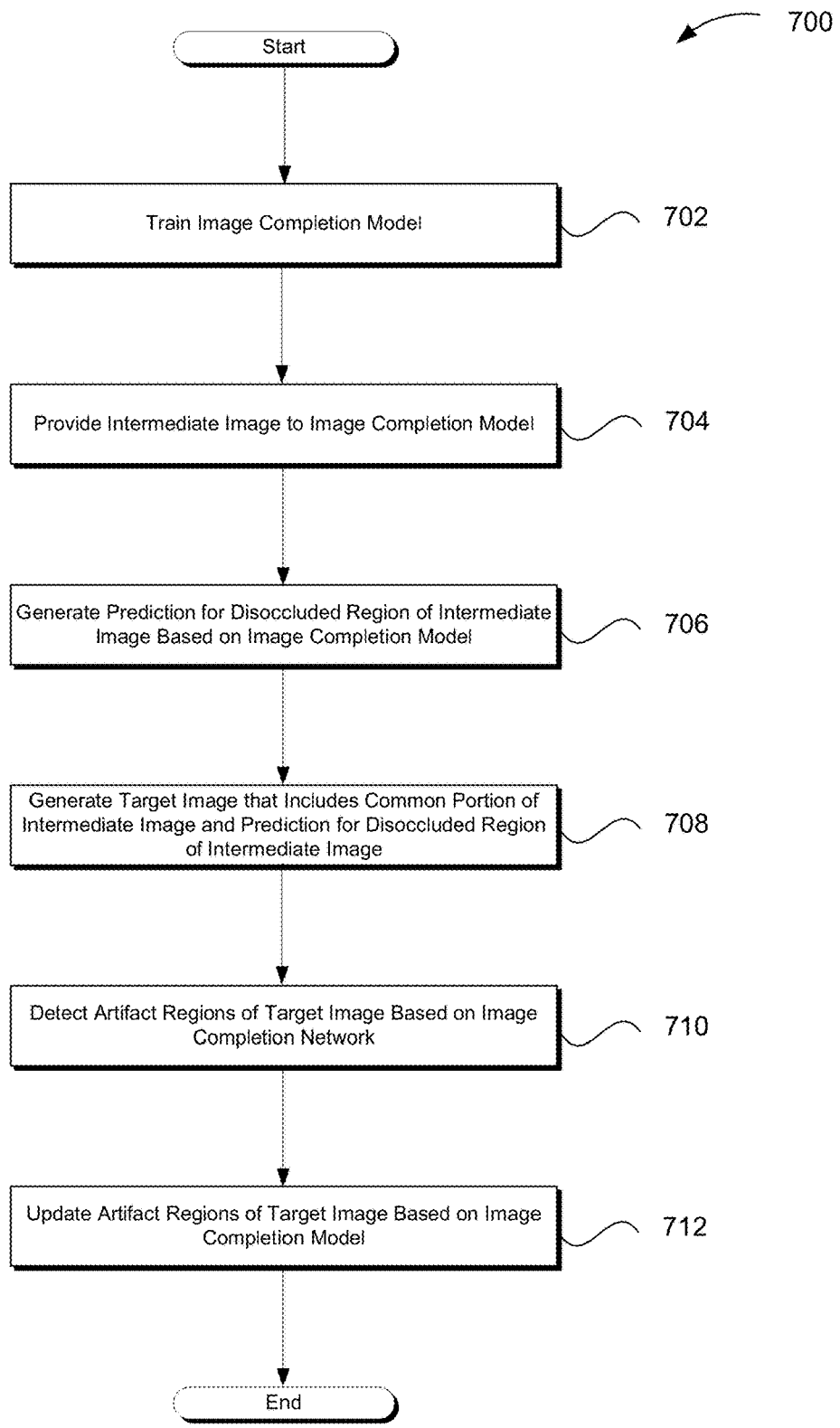
FIG. 7 illustrates one embodiment of a process flow for generating a target image based on an intermediate image that is consistent with the various embodiments presented herein.

FIG. 7 illustrates one embodiment of a process flow for generating a target image based on an intermediate image that is consistent with the various embodiments presented herein. Process 700 begins, after a start block, at block 702 where an ICM is trained. In various embodiments, training a ICM may include training a ICN that implements the ICM. Various embodiments for training a ICM and/or a ICN are discussed in conjunction with at least process 800 of FIG. 8A.

At block 704, an intermediate image is provided to an ICN that implements the trained ICM. For instance, FIG. 3A shows intermediate image 310 being provided to ICN 300. As discussed in conjunction with at least FIG. 3A, the intermediate image 310 may include a common region and a disoccluded region. As shown in FIG. 3A, the disoccluded region may be incomplete because the GFN that generated intermediate image 310 is a disocclusion-aware GFN. Essentially, such disocclusion-aware GFN generates a visibility map that is employed to mask off pixels included in the disocclusion region. Thus, the intermediate image may be an incomplete image.

At block 706, a prediction for the disoccluded region of the intermediate image is generated based on the ICM. As discussed throughout, the ICN is trained to generate such predictions. At block 708, a target image is generated based on the intermediate image and the prediction for the disoccluded region. More specifically, the target image includes the common region of the intermediate image and the prediction for the disoccluded region of the intermediate image. Thus, the ICN is trained to complete incomplete intermediate images. At block 710, artifact regions within the target image are detected. At block 712, the ICN updates the artifact regions of the target image. Process 700 may terminate and/or return a calling process.

Figure 8A:
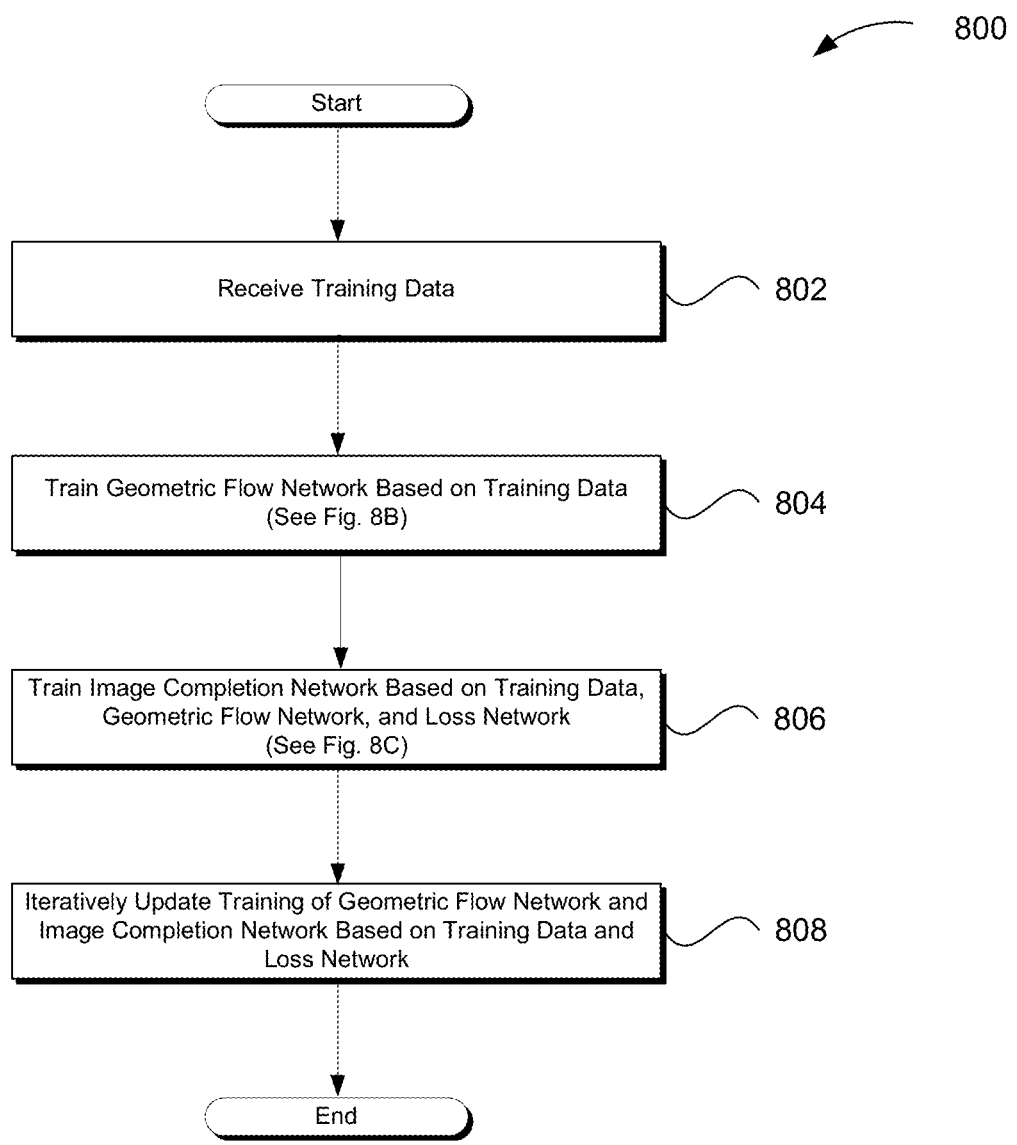
FIG. 8A illustrates one embodiment of a process flow for training an image completion system that is consistent with the various embodiments presented herein.

FIG. 8A illustrates one embodiment of a process flow for training an image completion system that is consistent with the various embodiments presented herein. Various embodiments of training an image completion system, such as but not limited to image completion system 150 of FIG. 1B, may include training one or more GFNs and/or one or more INCs, such as but not limited to GFN 160 and ICN 170. In at least one embodiment, training an image completion system may include training, or at least employing, one or more loss networks, such as but not limited to loss network 180.

Process 800 begins after a start block, at block 802, where training data is received. For instance, training data may be received via a training database, such as but not limited to training database 154 of FIG. 1B. The training data may include a plurality of 3D models. The 3D models may be models of various 3D training objects. Because the training data includes 3D models, the training data may be a 3D dataset.

At block 804, the GFN is trained based on the training data. Various embodiments of training a GFN are discussed in conjunction with at least process 820 of FIG. 8B. However, briefly here, training a GFN may include training a GFM to generate an intermediate image based on a source image, as discussed herein. The GFN may be a disocclusion-aware GFN. Thus, the GFN may be trained to generate visibility maps and background maps to generate an incomplete intermediate image.

At block 806, the ICN is trained based on the training data and the trained GFN. In various embodiments, the training of the ICN may be further based on a loss network, such as but not limited to loss networks 180 of FIG. 1B. Various embodiments of training an ICN are discussed in conjunction with at least process 860 of FIG. 8C. However, briefly here, training an ICN may include training an ICM to generate a target image based on the incomplete intermediate image. Thus, the ICM may be trained to generate a predication for a di socclusion region of the incomplete intermediate image.

At block 808, the training of the GFN and the ICN may be iteratively updated based on the training data and the loss network. Output from the at least partially trained GFN may be employed as a feedback signal to iteratively update that training of the at least partially trained ICN. Likewise, output from the at least partially trained ICN may be employed as a feedback signal to iteratively update the training of the at least partially trained GFN. When the training of each of these networks has satisfactorily converged, process 800 may terminate and/or return a calling process.

Figure 8B:
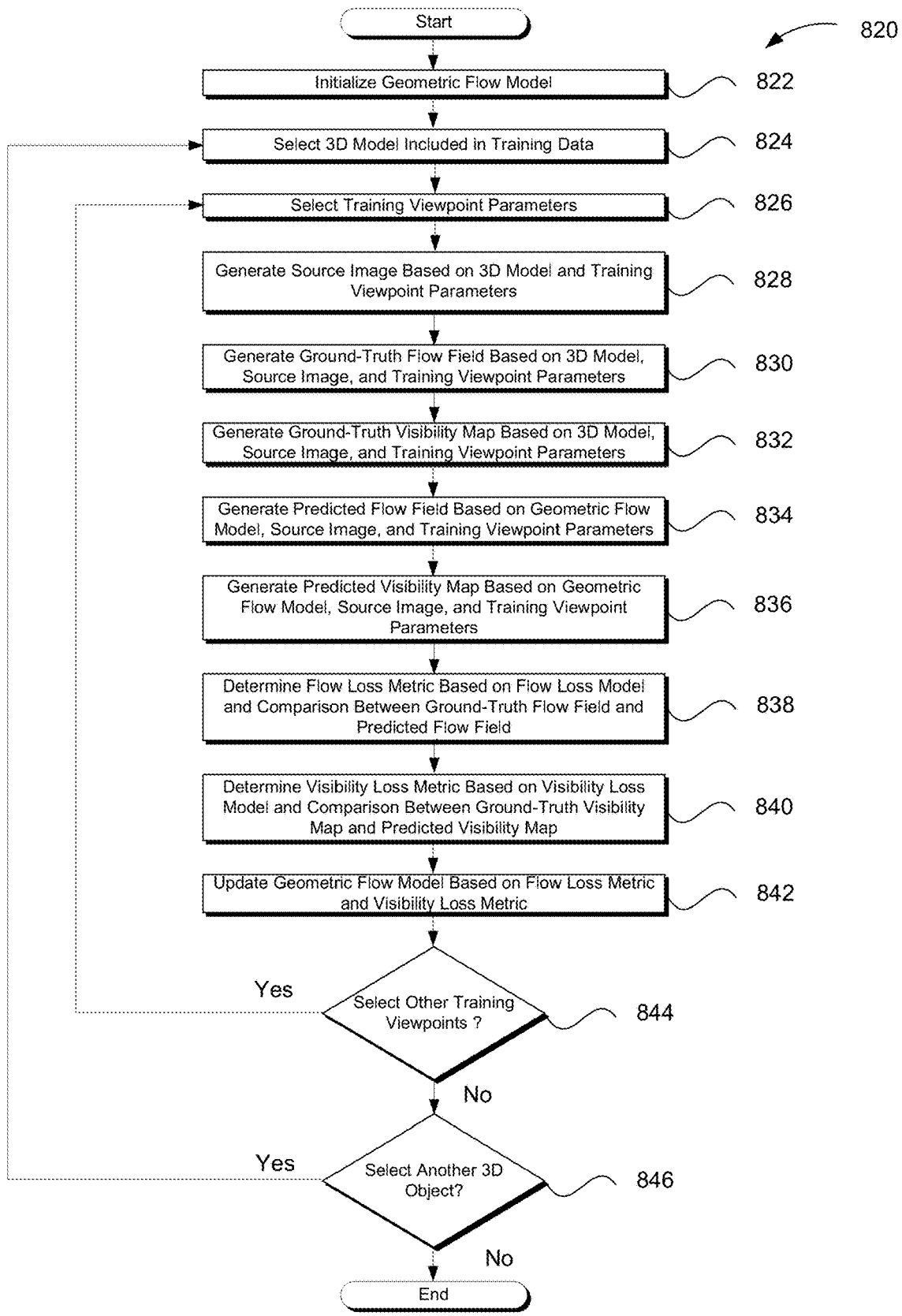
FIG. 8B illustrates one embodiment of a process flow for training a geometric flow network that is consistent with the various embodiments presented herein.

FIG. 8B illustrates one embodiment of a process flow for training a GFN that is consistent with the various embodiments presented herein. As discussed below, training a GFN may include supervised learning techniques. Process 820 begins after a start block, at block 822, where the GFM is initialized. Initializing the GFM may include initializing the weights of the GFM. At block 824, a 3D model from the training data is selected. The 3D model may be of virtually any object type, such as but not limited to an automobile, a chair, or any other 3D object. The 3D object may be a training object. At block 826, one or more training viewpoint parameters are selected. Training viewpoint parameters at block 826 may include one or more parameters that indicate a training source viewpoint and a training target viewpoint.

At block 828, a source image is generated. The source image may be a training source image of the object of the 3D model, from the training source viewpoint. The source image is based on the selected 3D model and the training viewpoint parameters. For instance, a source image of the 3D object from the training source viewpoint may be generated via the 3D model. Thus, the source image at block 828 may include a view of the training object from the training source viewpoint. The view of the training object may include a common portion of the training object.

At block 830, a ground-truth flow field is generated. The ground-truth flow field is based on the selected 3D model, the source image, and the training viewpoint parameters that indicate at least the training target viewpoint. At block 832, a ground-truth visibility map is generated. The ground-truth visibility map may be based on the selected 3D model, the source image, and the training viewpoint parameters.

At block 834, a predicted flow field is generated. The predicted flow field may be based on the GFM, the source image, and the training viewpoint parameters. At block, 836 a predicted visibility map is generated. The predicted visibility map may be based on the GFM, the source image, and the training viewpoint parameters.

At block 838, a flow loss metric is determined. The flow loss metric may be based on a flow loss model (or function) and a comparison between the ground-truth flow field and the predicted flow field. At block 840, a visibility loss metric may be determined. The visibility loss metric may be based on a visibility loss model (or function) and a comparison between the ground-truth visibility map in the predicted visibility map. The flow loss metric and the visibility loss metric may be employed, via back propagation, to train the geometric flow network.

At block 842, the GFM is updated based on the back propagated flow loss metric and the visibility loss metric. Updating the GFM may include updating and/or adjusting the weights of the GFM. Various embodiments of gradient descent, gradient ascent, or other methods for adjusting the weights of a machine-learning network may be employed to update the GFM.

At decision block 844, it is determined whether to select other training viewpoints. For instance, the GFM may be trained via other source viewpoints and/or other target viewpoints of the same 3D object. If other training source and/or target viewpoints are to be employed in the training of the GFM, process 820 returns to block 826 to select other training viewpoint parameters. Otherwise, process 820 flows to decision block 846.

At decision block 846, it is determined whether to select another 3D model. For instance, another 3D model of another object type may be used to further train the GFM. If another 3D model is to be selected, process 820 returns to block 824. Otherwise process 820 may terminate and/or return a calling process.

Figure 8C:
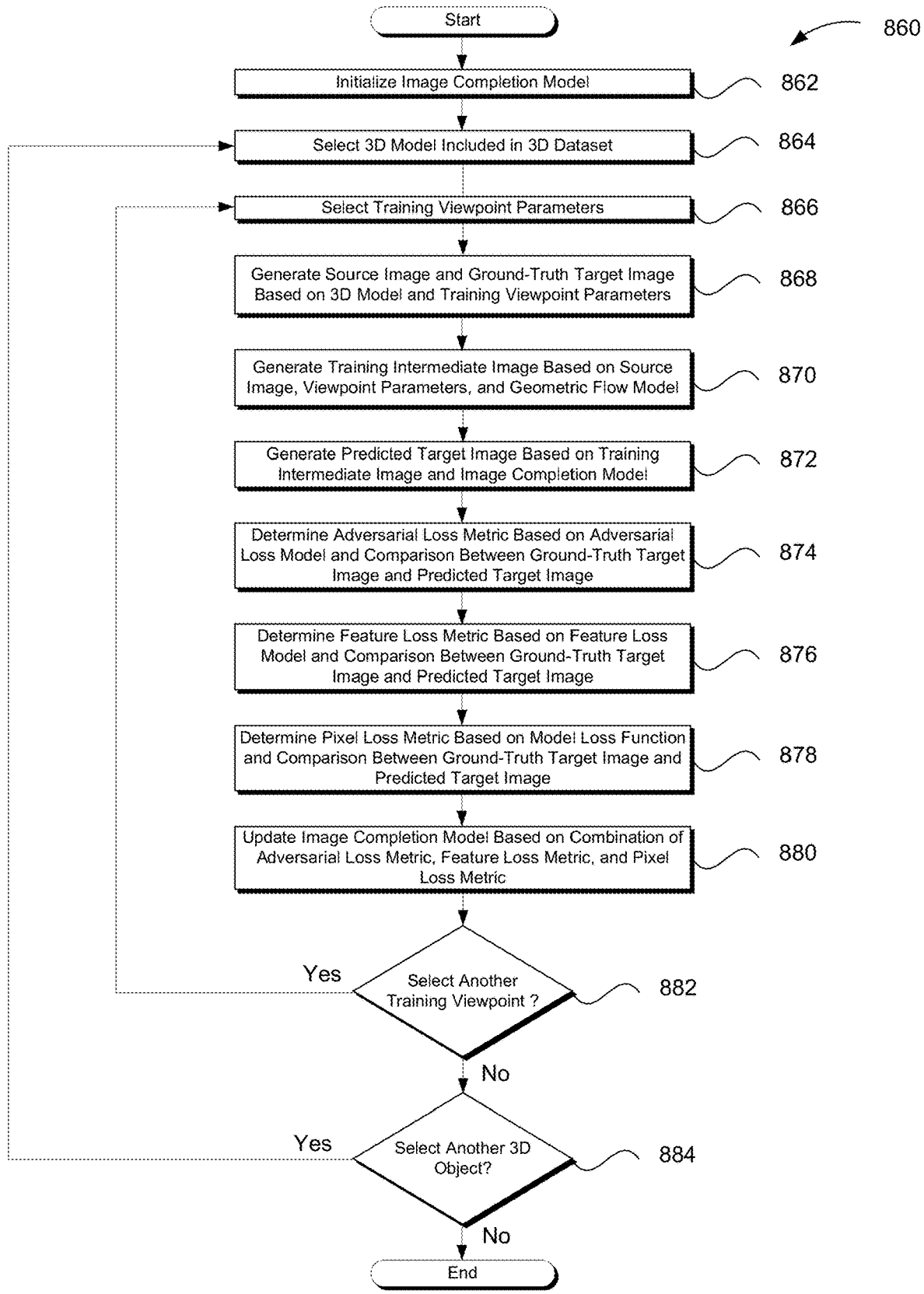
FIG. 8C illustrates one embodiment of a process flow for training an image completion network that is consistent with the various embodiments presented herein.

FIG. 8C illustrates one embodiment of a process flow for training an ICN that is consistent with the various embodiments presented herein. As discussed below, training an ICN may include supervised learning techniques. Process 860 begins after a start block, at block 862, where the ICM is initialized. Initializing the ICM may include initializing the weights of the ICM. At block 864, a 3D model from the training data is selected. The 3D model may be of virtually any object type. The 3D object may be a training object. At block 866, one or more training viewpoint parameters are selected. Training viewpoint parameters at block 866 may include one or more parameters that indicate a training source viewpoint and a training target viewpoint.

At block 868, a source image is generated. The source image may be a training source image of the object of the 3D model, from the training source viewpoint. The source image is based on the selected 3D model and the training viewpoint parameters. For instance, a source image of the 3D object from the training source viewpoint may be generated via the 3D model. Thus, the source image at block 868 may include a view of the training object from the source viewpoint. The view of the training object may include a common portion of the training object.

At block 868, a ground-truth target image is also generated. The ground-truth target image is based on the 3D model and the training viewpoint parameters. The ground-truth target image includes a ground-truth view of the selected training object from the training target viewpoint. The ground-truth view of the training object includes the common portion of the training object and a disoccluded portion of the training object that was occluded in the view of the source image. The common portion of the object is rotated relative to the common portion included in the view of the source image.

At block 870, a training intermediate image may be generated. The training intermediate image may be based on the source image, the selected viewpoint parameters, and the trained geometric flow model. For instance, an at least partially trained GFM may be employed to generate the training intermediate image based on the source image and the training target viewpoint. As discussed throughout, the training intermediate image may include a rotated view of the training object that is from the training target viewpoint. The rotated view of the training object includes a rotation of the common portion of the training object (relative to the view of the source image), as well as the disoccluded portion of the training object.

As noted throughout, the training intermediate image may be an incomplete image due to the disocclusion of the disoccluded portion of the object. As discussed, the GFM may employ a viability map to mask off pixels corresponding to the disoccluded portion of the object. Furthermore, the training intermediate image is a 2D image.

At block 872, a predicted target image is generated. The predicted target image is based on the training intermediate image and the ICM. More particularly, the ICM is employed to generate a predicted image of the disoccluded portion of the training object. The predicted target image may be a predicted complete version of the incomplete training intermediate image. That is to say, the predicted target image may include the rotated common portion of the object as well as the predicted disocclusion portion of the object.

At block 874, an adversarial loss metric is determined based on an adversarial loss model (or function). More specifically, the adversarial loss metric may be based on a comparison between the ground-truth target image and the predicted target image. The adversarial loss metric indicates a likelihood and/or probability that the predicted target image is a synthetic image.

More particularly, a loss network, such as but not limited to loss network 180 of FIG. 1B, that implements an adversarial loss model, such as but not limited to adversarial loss model 182, may be adversarially trained to discriminate between synthetic images and natural images.

At block 876, a feature loss metric based on a feature loss model (or function) is determined. More specifically, the feature loss metric may be based on the comparison between the ground-truth target image and the predicted target image. The feature loss metric indicates a perceptual loss of features that are included in the ground-truth target image, but not included in the predicted target image.

More particularly, a loss network, such as but not limited to loss network 180 of FIG. 1B, that implements a feature loss model, such as but not limited to feature loss model 184, may be trained recognize and/or detect features in images. More particularly, the convolutional layers in the loss network may be employed to detect features in each of the ground-truth target imaged and the predicted target image. The feature loss model detects the loss of object features included in the ground-truth target image but not included in the predicted target image.

At block 878, a pixel loss metric based on a pixel loss model (or function) is determined. More specifically, the pixel loss metric may be based on the comparison between the ground-truth target image and the predicted target image. The feature loss metric indicates a pixel-wise difference between the ground-truth target image and the predicted target image. In some embodiments, the feature loss metric indicates a pixel-wise difference between a gradient of the ground-truth target image and a gradient of the predicted target image.

At block 880, ICM is updated based on a combination of the adversarial loss metric, the feature loss metric, and the pixel loss metric. The combination of the loss metric may include a weighted (via one or more hyperparameters) linear or nonlinear combination of the adversarial loss metric, the feature loss metric, and the pixel loss metric. The combination may be a combination of various distances between the ground-truth target image and the predicted target image. The various distances may include Euclidean distances, Manhattan distances, or the like. The distances may include pixel-wise distances (or differences). In at least one embodiment, the pixel-wise distances may include pixel-wise distances in the gradients of the two images. The combination may be an overall loss function or loss metric. Thus, the overall loss metric include a linear/nonlinear combination of the adversarial loss metric, the feature loss metric, and the pixel loss metric. The overall loss metric may be back propagated.

At block 880, the ICM is updated based on the back propagated overall loss metric. Updating the ICM may include updating and/or adjusting the weights of the ICM. Various embodiments of gradient descent, gradient ascent, or other methods for adjusting the weights of a machine-learning network may be employed to update the ICM. In various embodiments, the ICM is updated to minimize the overall loss metric At decision block 882, it is determined whether to select other training viewpoints. For instance, the ICM may be trained via other source viewpoints and/or other target viewpoints of the same 3D object. If other training source and/or target viewpoints are to be employed in the training of the ICM, process 860 returns to block 866 to select other training viewpoint parameters. Otherwise, process 860 flows to decision block 886.

At decision block 884, it is determined whether to select another 3D model. For instance, another 3D model of another object type may be used to further train the ICM. If another 3D model is to be selected, process 860 returns to block 864. Otherwise process 860 may terminate and/or return a calling process.

Illustrative Computing Device

Figure 9:
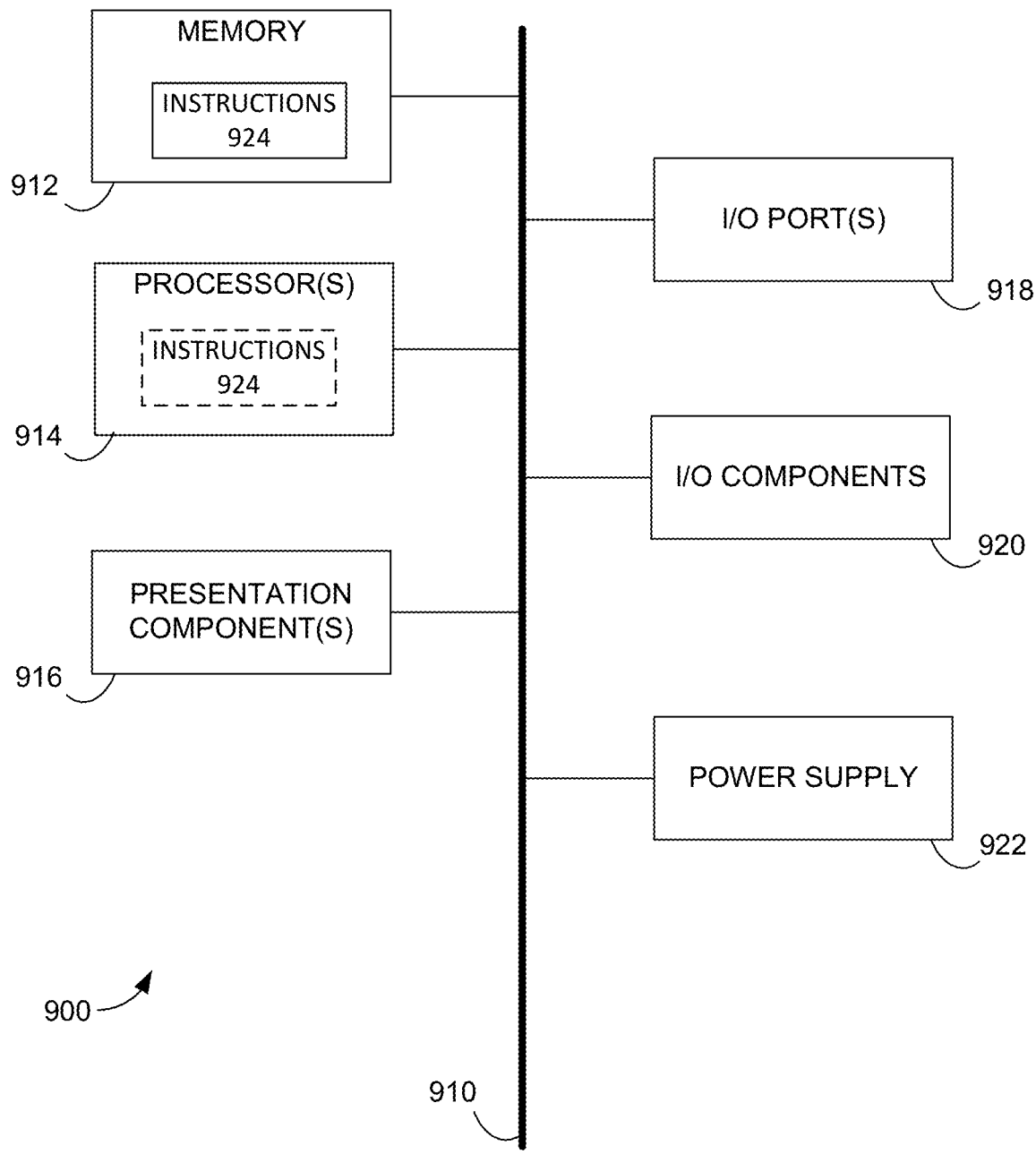
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects herein-above set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-readable storage medium having instructions stored thereon, which, when executed by a processor of a computing device cause the computing device to perform actions comprising:

receiving a source image that includes a first view of an object from a first viewpoint and includes a first portion of the object;

hallucinating a second portion of the object occluded in the first view of the object by generating values for masked pixels in an intermediate image of the object from a second viewpoint, the masked pixels corresponding to the second portion of the object occluded in the first view of the object;

generating a target image that includes a second view of the object from the second viewpoint, wherein the second view includes at least a sub-portion of the first portion of the object and the second portion of the object occluded in the first view, the second portion being predicted based on the generated values for the masked pixels; and providing the target image.

2. The one or more computer-readable storage media of claim 1, wherein the hallucinating further comprises:

generating the intermediate image that includes an intermediate view of the object from the second viewpoint, wherein the intermediate image includes a first region corresponding to the first portion of the object and a second region corresponding to the second portion of the object occluded in the first view; and updating the second region of the intermediate image corresponding to the second portion of the object to include a prediction of the second portion of the object.

3. The one or more computer-readable storage media of claim 2, wherein the hallucinating further comprises:

generating a flow field that maps a region of the source image corresponding to the first portion of the object to the first region of the intermediate image based on a rotational transformation from the first viewpoint to the second viewpoint;

determining a pixel value for each of a plurality of pixels included in the first region of the intermediate image based at least in part on the flow field; and generating the intermediate image further based on the pixel value for each of the plurality of pixels included in the first region of the intermediate image.

4. The one or more computer-readable storage media of claim 3, wherein determining the pixel value comprises the pixel value for each of the plurality of pixels is based on the flow field, a sampling kernel, and a portion of data that corresponds to the first portion of the object.

5. The one or more computer-readable storage media of claim 2, wherein generating the intermediate image is based on a geometric flow model that determines a rotation of the object about an axis that includes a component within a plane of two-dimensional (2D) data.

6. The one or more computer-readable storage media of claim 2, wherein generating the intermediate image further comprises:

employing a geometric flow model to determine the first region of the first view of the object, wherein the first region of the first view includes the first portion of the object;

employing the geometric flow model to generate a flow field that maps the first region of the first view of the target to the first region of the second view of the target; and generating the rotation of the first portion of the object based on the flow field, a sampling kernel, and a portion of the 2D data that corresponds to the first portion of the first view.

7. The one or more computer-readable storage media of claim 1, wherein the hallucinating further comprises:

generating a background map based on an intersection of a foreground region of the source image that corresponds to the object and a foreground region of an intermediate image that corresponds to the object, wherein the intermediate image includes an intermediate view of the object from the second viewpoint;

determining a background region of the intermediate image based on the background map; and determining a pixel value for each of a plurality of pixels included in the background region of the intermediate image based on a background region of the source image that is a complement of the foreground region of the source image.

8. The one or more computer-readable storage media of claim 1, further comprising training an image completion model, the training comprising:
providing an incomplete version of a first image, wherein the first image is a two-dimensional (2D) image based on a three-dimensional (3D) training data set;
generating a predicted version of the first image based on the image completion model and the incomplete version of the first image; and
updating the image completion model based on an adversarial loss metric.

9. The one or more computer-readable storage media of claim 1, further comprising training an image completion model, the training further comprising:
providing an incomplete version of a first image, wherein the first image is a two-dimensional (2D) image based on a three-dimensional (3D) training data set;
generating a predicted version of the first image based on the image completion model and the incomplete version of the first image;
determining a feature loss metric based on a comparison between the predicted version of the first image and the first image; and
updating the image completion model based on the feature loss metric.

10. A method for generating views of an object, comprising:
determining a new region of a new view of an object that includes a new portion of the object, the new region based on a rotational transformation applied to two-dimensional (2D) data;
predicting the new portion of the object by generating a prediction of values for masked pixels in an intermediate image of the object from the new view, the masked pixels corresponding to the new portion of the object occluded in an initial view of the object; and
providing a target image that includes the new view of the object, wherein the new region of the new view includes the prediction of the new portion of the object.

11. The method of claim 10, further comprising:
determining a initial region of the new view of the object, wherein the initial region includes an initial portion of the object that is disoccluded in each of the initial view and the new view of the object;
generating a rotation of the initial portion of the object, wherein the rotation includes a visual representation of the rotational transformation applied to a portion of the 2D data corresponding to the initial portion of the object included in the initial view of the object; and
providing the new view of the object, wherein the initial region of the new view includes the rotation of the initial portion of the object.

12. The method of claim 10, further comprising:
determining an initial region of the initial view of the object that includes the initial portion of the object;
generating a flow field that maps the initial region of the initial view of the target image to the initial region of the new view of the target image; and
generating the rotation of the initial portion of the object based on the flow field, a sampling kernel, and a portion of the 2D data that corresponds to the initial portion of the initial view.

13. The method of claim 10, further comprising:
generating a visibility map based on the rotational transformation applied to the 2D data; and
generating an intermediate view of the object, the intermediate view of the object from the new viewpoint, wherein the new region of the new view of the object is masked from the intermediate view based on the visibility map.

14. The method of claim 10, further comprising:
generating three-dimensional (3D) coordinates for the object based on the 2D data;
determining a background region of the initial view of the object based on a background mask for the object and the 2D data, wherein the background mask is generated for the object based on the 3D coordinates for the object;
generating a background region of the new view of the object based on the background region of the initial view and the background mask for the object; and
including the background region of the new view in the provided new view of the object.

15. The method of claim 10, further comprising:
training an image completion model, the training comprising:
providing an incomplete version of a first image, wherein the first image is a two-dimensional (2D) image based on a three-dimensional (3D) training data set;
generating a predicted version of the first image based on the image completion model and the incomplete version of the first image; and
updating the image completion model based on an adversarial loss metric.

16. The method of claim 10, further comprising:
training an image completion model, the training comprising:
providing an incomplete version of a first image, wherein the first image is a 2D image based on the 3D training data set;
generating a predicted version of the first image based on the image completion model and the incomplete version of the first image;
determining a feature loss metric based on a comparison between the predicted version of the first image and the first image; and
updating the image completion model based on the feature loss metric.

17. The method of claim 10, further comprising:
training an image completion model, wherein the image completion model is trained with a feature loss metric in combination with an adversarial loss metric, wherein the adversarial loss metric discriminates between synthetic images and natural images and the feature loss metric discriminates between physical features included in a plurality of image.

18. A computing system for providing views of an object, comprising:
means for generating an image completion model based on a 3D training dataset and a geometric flow model;
means for generating a predicted image of a disoccluded portion of a 3D object depicted in a two-dimension (2D) image by hallucinating the disoccluded portion of the 3D object using generated values for masked pixels in an intermediate image of the 3D object from a second view different than an initial view, the masked pixels corresponding to the second portion of the object occluded in the initial view of the object, wherein the predicted image is generated using the image completion model and a generated intermediate view related to the intermediate image; and means for generating a target image that includes the second view of the 3D object, wherein the target image includes the predicted image.

19. The computing system of claim 18, further comprising:

means for training the geometric flow model.

20. The computing system of claim 18, further comprising:

means for providing the target image to a user.

* * * * *

UNITED STATES PATENT AND TRADEMARK OFFICE
CERTIFICATE OF CORRECTION

PATENT NO. : 11,115,645 B2
APPLICATION NO. : 16/230872
DATED : September 7, 2021
INVENTOR(S) : Jimei Yang et al.

It is certified that error appears in the above-identified patent and that said Letters Patent is hereby corrected as shown below:

In the Claims

In Column 26, Line 19, Claim 2, delete "ob ject." and insert -- object. --, therefor.

In Column 28, Line 60, Claim 18, delete "two-dimension" and insert -- two-dimensional --, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*